May 6, 1969 W. H. KASTNING 3,443,210
TEST CIRCUIT FOR EVALUATING MAGNETIC MEMORY DEVICES
Filed Aug. 26, 1964
Sheet 1 of 12

INVENTOR
WILLIAM H. KASTNING
by A. C. Schwarz, Jr.
ATTORNEY

TEST CIRCUIT FOR EVALUATING MAGNETIC MEMORY DEVICES

Filed Aug. 26, 1964

United States Patent Office 3,443,210
Patented May 6, 1969

3,443,210
TEST CIRCUIT FOR EVALUATING MAGNETIC MEMORY DEVICES

William H. Kastning, Aurora, Ill., assignor to Western Electric Company, Incorporated, New York, N.Y., a corporation of New York Filed Aug. 26, 1964, Ser. No. 392,139
Int. Cl. G01r 33/12, 15/12
U.S. Cl. 324—34 22 Claims

ABSTRACT OF THE DISCLOSURE

An apparatus for evaluating magnetic cores having a core handler moving cores through a test station at which probes are inserted to either accept or reject stations. Signals defining distinct time slots in a time frame derived from a program generator are applied to core drivers and signal detectors coupled to the test core by the probes to permit the core to be placed in different magnetic states and evaluated by different detectors in any desired sequence of time slots or different points within a time slot. The operation of the program generator is interlocked with the movement of the probes in the core handler.

This invention relates to a mangetic testing apparatus and, more particularly, to an apparatus for automatically testing and evaluating magnetic cores or elements.

Magnetic elements, such as toroidal or multi-aperture magnetic cores, provide relatively compact and economic means for storing data bits and for performing other logic operations in digital data handling systems. In some of the applications in which these elements are used, such as memory planes, a relatively large number of the cores are carried on a common support provided with a number of separate drive, bias, and sense windings. Because of the small size of the magnetic cores and the density of these cores on the supporting member, the formation of these windings frequently requires a considerable amount of manual labor, and a significant part of the cost of the completed unit represents labor. Thus, if a completed assembly is found to be defective, after completion of the unit because of incorrect windings or poor core characteristics resulting from one of a number of causes, such as incorrect formulation of the magnetic material or cracked or broken core bodies, a substantial loss is incurred. This loss is aggravated because it is difficult and, in some instances, impossible to replace a defective core in a completely wired assembly. Accordingly, it would be desirable to fully evaluate each individual magnetic element prior to assemby as part of an operating circuit. Further, since the number of magnetic elements used in these assemblies is very large, the system and apparatus used to evaluate or check the magnetic elements should be fully automatic and designed for use in conjunction with automatic core handling equipment.

Accordingly, one object of the present invention is to provide a new and improved apparatus for testing and evaluating magnetic elements.

Another object is to provide an apparatus for automatically testing magnetic cores for and selecting magnetic cores on the basis of predetermined electrical and magnetic characteristics.

A further object is to provide a magnetic core or element testing apparatus in which core driver and evaluating circuits are sequentially coupled to the core in selected time slots of a repetitive time frame.

Another object is to provide a magnetic core testing apparatus including selectively operable program means for conditioning the apparatus to perform a selected one or more of a plurality of different tests on the core.

Another object is to provide a magnetic core testing apparatus including storage means in which the results of a prior test are stored to permit an evalution to be performed on a given core while a core handling operation is performed on a previously tested core.

A further object is to provide a core testing apparatus in which core drive and sense units are sequentially coupled to the core in selected time slots of a repetitive time frame under the control of a program generator and in which the operation of the program generator is synchronized with an apparatus for automatically feeding and selecting the cores.

Another object is to provide a magnetic core evaluating circuit including means for supplying selected core read and write signals of controllable widths at variable positions within discrete time slots in repetitive time frames.

A further object is to provide a magnetic core evaluating circuit including new and improved means for evaluating the switching times of magnetic cores.

Another object is to provide a magnetic core testing apparatus including new and improved circuits for evaluating the "0" and "1" response of magnetic cores.

A further object is to provide a magnetic core testing apparatus including means for automatically performing a sequence of different tests on a magnetic core and for rejecting a core that fails any of the sequentially performed tests.

In accordance with these and many other objects, an embodiment of the invention comprises an apparatus for automatically evaluating the electrical and magnetic characteristics of a magnetic element, such as a transfluxor comprising a generally uniplanar body of magnetic material having three apertures therein. The apparatus includes an automatic core handling unit for sequentially presenting magnetic cores to a test station in which probes are placed in the three openings to simulate drive and sense windings and for then feeding the tested core or transfluxor element in sequence to reject and accept stations providing core selecting or classifying means. If the core satisfies the tests or evaluations performed in the testing station, reject means in the reject station are rendered ineffective, and the core is automatically removed from the transfer or handling mechanism at the accept station. Alternatively, if the results of the testing operation are not satisfactory, the unsatisfactory results are shifted out of the test circuit into a storage circuit which renders the reject mechanism effective to reject the unacceptable core when it reaches the reject station while another test is being performed at the testing station on the next following magnetic core.

The testing and evaluating circuit includes a plurality of difference amplifiers coupled to the probe providing the sense winding for the core. The remaining apertures of the core are probed to provide drive and inhibit windings to which read, write, and inhibit pulses are supplied by core driver amplifiers. By establishing different sensitivities for the detectors coupled to the sense winding and by providing selected sequences and combinations of read, write, and inhibit signals to the core, the different characteristics of the core, such as the "0" and "1" response and the "1" switching time can be determined.

The performance of one or a sequence of different tests on the core is controlled by a program generator forming a part of the testing and control circuits. This program generator provides a plurality of discrete signals in spaced time slots of a repetitive time frame, the duration and positions of which signals within the time slots can be adjusted. Signals appearing in different ones of the time slots are coupled to enabling gates for the core drivers and detectors to permit a desired sequence of different test operations to be performed on the core in different slots of the time frame. As an example, the write current driver can be rendered effective to drive the core in a given time position, and the read current driver together with one or more of the detectors can be rendered effective in a subsequent time slot to evaluate the preceding write operation. By varying the sensitivities of the detectors as well as the combinations of detectors and drive sources rendered effective either concurrently or in different sequences, a variety of different tests can be performed with a given testing apparatus by simple manual adjustment. The test program, once established, can be indefinitely repeated in a timed relation with the apparatus for automatically feeding, accepting, and rejecting the cores.

Many other objects and advantages of the present invention will become apparent from considering the following detailed description in conjunction with the drawings in which:

FIGS. 2A–6B illustrate logic symbols and representative logic circuits used in the system;

Figure 26:
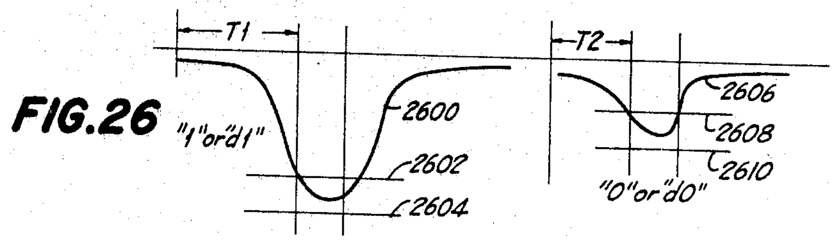
Figure 27:
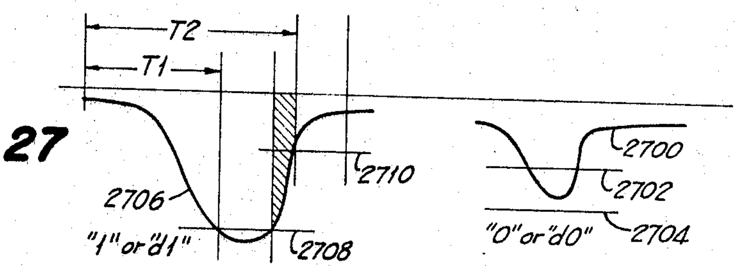
Figure 28:
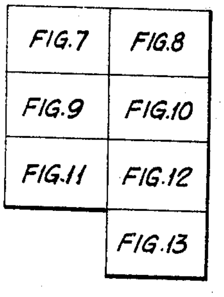

FIGS. 7–13 form a complete logic diagram of a magnetic testing unit embodying the present invention;

FIGS. 14–18 are schematic diagrams illustrating the magnetic states of an inhibited flux switching mode in which a magnetic core or transfluxor element is tested by the apparatus of the present invention;

FIGS. 19–23 are schematic diagrams illustrating the magnetic states of an uninhibited flux switching mode in which the transfluxor element is operated in a typical application, such as a memory plane;

FIGS. 24–27 show waveforms illustrating different ones of the core evaluation tests performed by the apparatus of the present invention; and FIG. 28 is a block diagram illustrating the manner in which FIGS. 7–13 of the drawings are placed adjacent each other to form a complete logic diagram of the magnetic testing apparatus embodying the present invention.

The magnetic core testing and selecting circuits and apparatus embodying the present invention automatically subject a magnetic core or element to one or a sequence of different selected tests to evaluate the electrical and magnetic characteristics of the ultimate product in which the core is to be used, such as memory planes for an electronic switching system. In a preferred embodiment, the testing and evaluating circuits operate in conjunction with an automatic core handling apparatus which feeds individual cores from a bulk supply to a testing position and then transports the tested cores to subsequent stations forming a core selecting means in which they are accepted or rejected in accordance with the results of the testing and evaluating operations. This system can be used to test a variety of different types of magnetic storage or logic elements of various configurations and characteristics. Although this system can be used with many different types of magnetic elements, its operation is described in conjunction with the testing and evaluation of a plural aperture memory core or transfluxor element 100 (FIGS. 14–23).

The magnetic core or transfluxor element 100, which can be of the same general type as that shown and described in U.S. Patent No. 2,926,342, comprises a generally uniplanar and rectangular body of a square loop ferrite material formed, for instance, of a zinc-magnesium-manganese-ferrite mixture. This material is suitable for high speed storage and switching elements because of its substantially rectangular hysteresis loop (a coefficient of squareness of .95) and its high direct current resistivity on the order of $10^6$ ohm-centimeter. One ferrite core with which the testing apparatus has been used comprises a .121 x .090 x .016 inch body with three .018 inch openings 102, 104, and 106 spaced along its longitudinal axis on .04 inch centers so as to divide the length of the core

100 into four transversely extending core legs 108, 110, 112, and 114.

In both testing and use, the apertures 102 and 104 of the magnetic core 100 are threaded by drive windings, and the aperture 106 is threaded by a sense winding. Since the sense or output winding is separated from the drive windings, the flux reversals in the core leg 114 required for the production of an output potential in the sense winding are obtained by flux steering operations in the various legs of the core 100 in response to programmed combinations of drive currents. One flux steering mode is used for testing the magnetic core 100, and a different flux steering mode is used when the core 100 forms a part of the memory plane.

Figure 19:
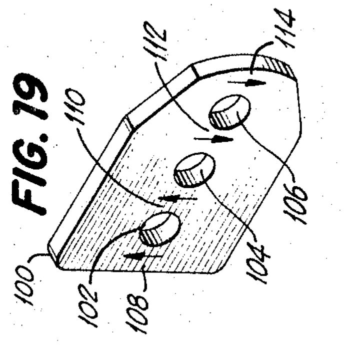

An uninhibited flux steering mode is used when the core 100 forms a part of a memory plane, and the flux states in the core 100 obtained in the uninhibited mode are illustrated in FIGS. 19–23 of the drawings. In these drawings, the directions of the remanent magnetic states in the core legs 108, 110, 112, and 114 are illustrated by the arrows appearing thereon. FIG. 19 shows the core in an initial or normal condition following a read operation in which the flux in the core legs 108 and 110 is directed upwardly and the remanent flux in the legs 112 and 114 is directed downwardly.

Figure 20:
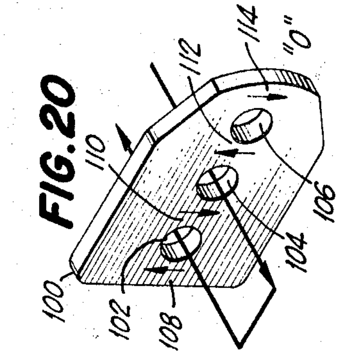

In the uninhibited flux switching mode used in the completed memory plane of which the core 100 is to form a part, concurrent currents are used to write or store a binary "1" so as to facilitate core selection. FIG. 20 of the drawings illustrates one of these two concurrent drives which leaves the core 100 in a "0" state. The drive shown in this figure includes a current flowing out of the page through the center aperture 104 and into the page through the end aperture 102. This results in a reversal of the remanent magnetic states in the legs 110 and 112. However, this does not result in a change in the remanent flux state of the leg 114 coupled by the sense winding.

Figure 21:
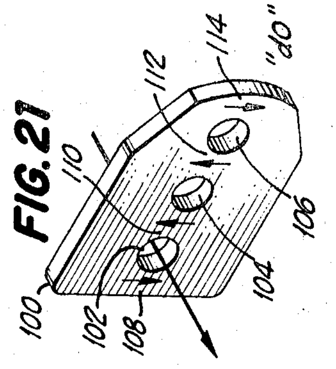

The individual application of the other one of the two drives used to write a "1" changes the core 100 to the magnetic condition shown in FIG. 21 which is identified as a disturbed "0" or a "*d*0" state. This second drive consists of a current flowing out of the page through the end aperture 102 and results in a remanent magnetic state in which the flux in the two center legs 110 and 112 is upwardly directed and the flux in the end legs 108 and 114 is downwardly directed. The area of the leg 112, which is somewhat larger than the area of the legs 108 and 110, absorbs any flux tending to switch the remanent state of the leg 114 when the drive shown in FIG. 21 is applied.

Figure 22:
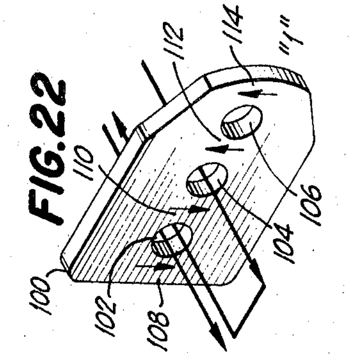

To write the "1" in the core 100 using the uninhibited switching mode, both of the drives shown in FIGS. 20 and 21 are applied, as illustrated in FIG. 22 of the drawings. The concurrent application of these two drives shifts the remanent magnetic states of the legs 108, 110, 112, and 114 to a position completely reversed from that provided in the core 100 in its initial state (FIG. 19). More specifically, the flux in the legs 108 and 110 is downwardly directed, and the flux in the legs 112 and 114 is upwardly directed. Thus, when the core 100 has been placed in a "1" state, the flux in the output or sense core leg 114 has been reversed.

Figure 23:
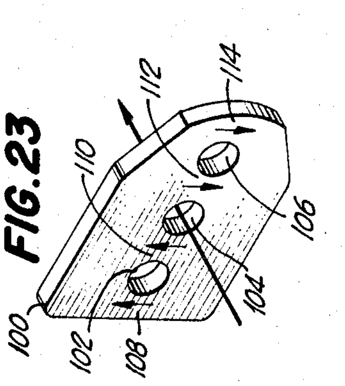

The magnetic state of the core 100 is read in the uninhibited mode by a single read drive signal or pulse passing inwardly into the page through the center aperture 104 as illustrated in FIG. 23 of the drawings. This read pulse restores the remanent flux conditions in the legs 108, 110, 112, and 114 to the initial state illustrated in FIG. 19 in which the flux is upwardly directed in the legs 108 and 110 and is downwardly directed in the legs 112 and 114. If the read pulse is applied to the center aperture 104 with the core 100 in the "0" state shown in FIG. 20 or the "*d*0" state shown in FIG. 21, the direction of the flux in the output leg 114 is not reversed, and an output or response voltage is not induced in the sense winding. Alternatively, if the core 100 is in the "1" state shown in FIG. 22, the application of the read pulse shown in FIG. 23 reverses the flux in the core leg 114 and induces an output potential in a sense winding linking this leg.

Thus, the operation of the core 100 in the uninhibited mode in the memory plane requires the application of the concurrent drives shown in FIG. 22 to write a "1" in the core 100 and therefore provides the selectivity desirable in the memory plane. However, the use of the uninhibited mode in testing the core element 100 would require the establishment of two windings in the end drive hole 102 of the core 100. The diameter of this aperture is only .018 inch, and it is quite difficult to provide two windings in an opening of this size with a mechanical probing fixture of the type desirable in automatic handling equipment capable of testing a large number of cores 100 in a short period of time. Accordingly, in the testing apparatus embodying the present invention, the cores 100 are tested using an inhibited flux steering mode. This flux steering mode provides magnetic states substantially corresponding to those provided in the core 100 when operated in the uninhibited mode, but does not require the presence of more than a single winding in any of the drive apertures 102 and 104.

The drives used in the inhibited flux steering mode and the resulting magnetic states in the core 100 are illustrated in FIGS. 14–18 of the drawings. The initial state of the core 100 or its condition following a read operation is the same as that illustrated in FIG. 19 of the drawings. In the inhibited mode, concurrent drives are used to place the core 100 in a "0" condition, and a single drive is used to place the core in either of two different "1" conditions.

Figure 14:
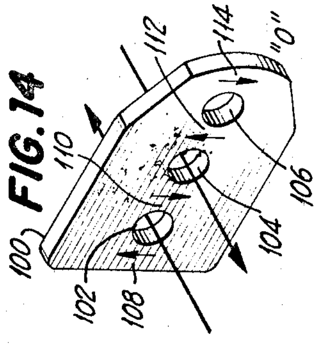

In the inhibited mode, the core 100 is placed in a "0" condition by providing a write current flowing out of the page through the center aperture 104 and by providing an inhibit current flowing into the page through the end aperture 102, as shown in FIG. 14. This places the remanent flux states in the four core legs 108, 110, 112, and 114 in the same condition as in the "0" condition provided by the single drive conductor in the uninhibited flux switching mode (FIG. 20) which returns through the end aperture 102. Thus, the flux in the sense leg 114 of the core 100 is not shifted from the initial condition shown in FIG. 19 when the core 100 is placed in a "0" condition.

If the "0" state of the magnetic core 100 is disturbed by the application of an inhibit signal comprising a current passing into the page through the opening 102 (FIG. 17), the core geometry does not permit the flux states in the core legs to change and the direction of the flux in the sense leg 114 remains unchanged. Thus, the disturbed "0" or "*d*0" condition of the core 100 in the inhibited mode (FIG. 17) provides flux states in the legs 108, 110, 112, and 114 which are identical to the "0" state of the core 100 in the uninhibited mode (FIG. 20).

Figure 15:
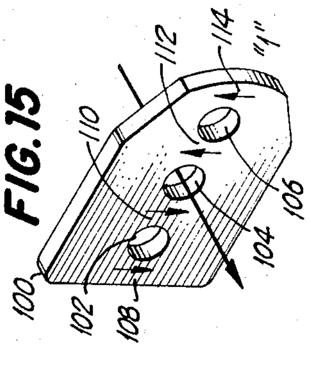

The core 100 is switched to a "1" condition by providing a current out of the page through the center aperture 104, as shown in FIG. 15. In the "1" state, the flux in the legs 108 and 110 is directed downwardly, and the flux in the legs 112 and 114 is directed upwardly. This provides the same "1" magnetic state illustrated in FIG. 21 of the drawings for the uninhibited "1." Thus, the flux in all of the legs 108, 110, 112, and 114 has been reversed from the initial state shown in FIG. 19 without requiring the plurality of windings in the drive aperture 102 used in the uninhibited mode.

Figure 16:
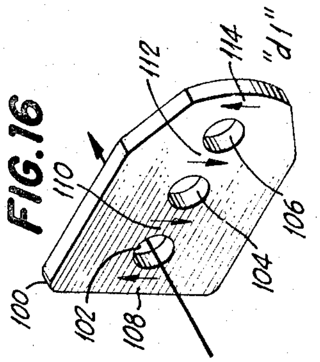
Figure 17:
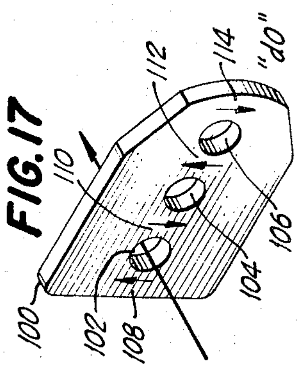

In the inhibited mode, the provision of an inhibit current into the page through the end drive hole 102, as shown in FIG. 16, results in disturbed or loaded "1" flux state in the core 100 designated by the symbol "*d*1." In this state, the flux in the core leg 112 is reversed in direction from that provided in the "1" state (FIG. 15). This reversal has the effect of providing a somewhat greater amplitude "1" output signal when the core 100 is read. This greater amplitude output signal is due to the fact that the flux in the legs 108 and 112 is already in the direction in which it is placed by the read signal, and less flux reversal is required to switch the core 100 from a loaded "1" or "*d*1" condition (FIG. 16) than from the normal "1" state (FIG. 15). Since the magnitude of the output potential developed in the sense winding linking the sense leg 114 is proportional to the rate of change in the flux in the core leg 114, the faster reversal of the flux in this core leg when the core 100 is in the "*d*1" condition results in a somewhat greater amplitude output potential.

Figure 18:
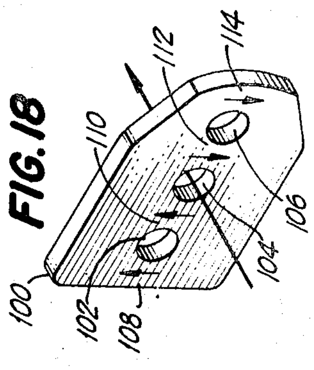

The core 100 is read in the inhibited mode in the same manner as in the uninhibited mode by providing a read current into the page through the center drive aperture 104 (FIG. 18). This restores the flux in the core legs 108, 110, 112, and 114 to the initial state shown in FIG. 19. If the core 100 is in one of the magnetic states shown in FIG. 15 or 16 when the read current is applied, the reversal of the direction of flux in the core leg 114 produces an output potential in the sense winding linking the leg 114. Alternatively, if the core 100 is in the "0" or "*d*0" conditions shown in FIGS. 14 and 17, the direction of the flux in the core leg 114 is not reversed, and an output signal is not induced in the sense winding.

Thus, the core 100 can be operated in the inhibited flux switching mode illustrated in FIGS. 14–18 to provide "0," "*d*0," "1," and "*d*1" states substantially identical to the similar states provided in the uninhibited flux switching mode illustrated in FIGS. 19–23 of the drawings. However, by operating in the inhibited flux switching mode, the need for establishing two windings in any given one of the drive apertures 102 or 104 does not arise, and this makes operation in the inhibited mode preferable for testing operations requiring mechanical probes while permitting the same testing and evaluation of the core 100 as if operated in the uninhibited mode used in the memory plane.

Figure 1:
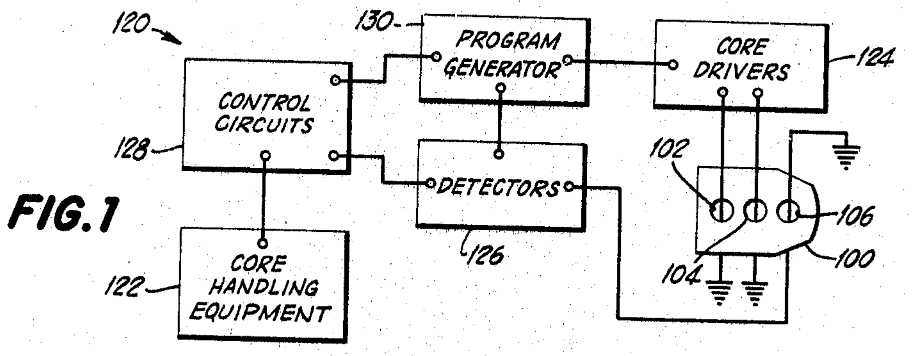
FIG. 1 is a block diagram of a magnetic core testing and selecting apparatus embodying the present invention.

Referring now more specifically to FIG. 1 of the drawings, therein is illustrated a block diagram of a magnetic core testing or evaluating system 120 which embodies the present invention and which is adapted to evaluate the electrical and magnetic characteristics of the magnetic cores 100 which can be supplied either automatically or manually to the test equipment. In the preferred embodiment of the invention, the system 120 includes an automatic core handling unit 122 comprising a core transporting turntable that is successively rotated or indexed from a feeding position in which successive cores are placed on the turntable to a testing position in which a core is prepared for test by inserting probes into the openings 102, 104, and 106 to provide one t urn windings. In this testing position, the probes inserted into the drive holes 102 and 104 are connected to a group of core drivers 124 including pulse sources supplying oppositely poled read and write signals to the probes passing through the center opening 104 and inhibit pulses of a single polarity to the probe inserted through the opening 102. The probe passing through the sense opening 106 is coupled to the inputs of a plurality of detectors 126, the outputs of which are supplied to a control circuit 128.

The test or sequence of tests performed on the core 100 in the testing position are conjointly controlled by the control circuit 128 and a program generator 130. The program generator 130 provides enabling or control signals in a plurality of discrete time slots in a recurring or repetitive time frame, and the control signals can be adjusted to occupy different positions within the time slots and to have different widths. Selected combinations of the control signals are supplied from the program generator 130 to the core drivers 124 to provide write, read, and inhibit pulses to the core 100 in any desired sequence. The plurality of detectors 126 are also supplied with selected combinations of the control signals from the program generator 130 to render these detectors responsive to signals developed in the sense probe in selected time slots.

The core testing apparatus or system 120 is capable of performing a number of different individual tests or sequences of tests on the cores 100. As an example, one set of tests consists of determining whether a "1" or "*d*1" stored in the core 100 produces an output or response signal having an amplitude greater than a given value but less than another value and of determining whether a stored "0" or "*d*0" produces an output signal having an amplitude greater than a given value but less than another value. When this test is to be performed, two pairs of the plurality of detectors 126 are provided with reference potentials corresponding to the high and low limiting values for the "0" and "*d*0" response signals. To carry out this testing program, signals from the program generator 130 are supplied to the core drivers 124 to first write a "1" or "*d*1" in the core 100 in a given time slot and then to supply a read signal in a subsequent time slot. The program generator 130 also enables the two "1" evaluating detectors 126 in the same time slot as the read pulse so that this group of detectors responds to the voltage induced in the probe in the sense opening 106. The control circuit 128 is provided with indications from the detector 126 indicating the satisfactory or unsatisfactory completion of the test on the minimum and maximum amplitudes of the voltage developed by reading the "1" or "*d*1."

The program generator 130 also supplies signals to the core drivers 124 in different subsequent time slots to write a "0" or "*d*0" in the core 100 and to read the previously stored "0" or "*d*0." The two "0" evaluating detectors are enabled by the program generator 130 in the same time slot as the read driver so that the output signal developed in the probe in the sense opening 106 is compared against the high and low limits in the two "0" evaluating detectors 126. The results of this test are also supplied to the control circuit 128. At the completion of the time frame in which the "0" and "1" evaluation tests are performed, the control circuit 128 disables or momentarily inhibits further operation of the program generator 130.

At this time, the control circuit 128 determines whether both of the "1" and "0" evaluating tests on the core 100 have been satisfactorily completed, and the results of this comparison are transferred to data storing means. The core handling equipment 122 now withdraws the probes, advances the previously tested core 100 to a reject position, advances the next core 100 to be tested to the testing position, and reinserts the probes. If the data storing means indicates that the tests on the preceding core 100 now in reject position did not yield satisfactory results, a reject mechanism in the core handling equipment 122 rejects the unsatisfactory core. Alternatively, if the data storage means indicates that satisfactory results were obtained from the previously tested core 100, the reject mechanism is disabled so that when the turntable is advanced an additional step at the completion of the next testing operation, the tested core remaining on the turntable is advanced to an accept station and discharged into a receiver for acceptable cores. In this manner, successive cores 100 are automatically tested for proper magnetic and electrical operating characteristics and are separated into acceptable and unacceptable groups. In one magnetic testing apparatus 120 constructed in accordance with the present invention, thirty cores per minute have been automatically checked and evaluated using the automatic core handling equipment 122. The same testing procedures can be carried out using a fixture in which the cores 100 are supplied manually. Further, the system 120 is capable of performing a variety of other tests, such as an evaluation of the "1" switching time of the core and the determination of the magnitude of any of the output or response potentials at different times within a read cycle.

The details of the magnetic core testing system 120 shown in block form in FIG. 1 are illustrated in FIGS. 7–13 of the drawings by use of logic diagrams in which the various circuit components are shown in logic schematic form. In the logic diagrams, each circuit component, such as an inverter, is represented by a particular logic symbol. The logic symbols for certain of the circuit components together with typical circuit arrangements represented by the symbols are illustrated in FIGS. 2–6 of the drawings. Each of these figures includes both an illustration of the logic symbol and a typical circuit represented by the symbol. Although the illustrated representative circuits are conventional in design, a brief description of these circuits is set forth below.

Figure 2A:
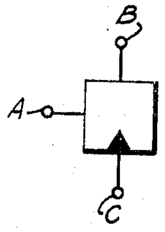
Figure 2B:
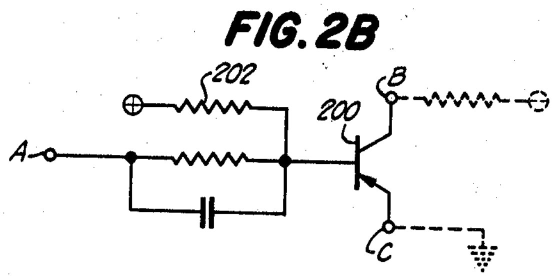

The logic symbol for an inverter is illustrated in FIG. 2A, and a typical circuit for this inverter is illustrated in FIG. 2B. The circuit includes a transistor 200 whose collector electrode is connected to a terminal B and whose emitter electrode is connected to a terminal C. In circuit applications, the terminal B is normally connected to a nominal negative potential of fifteen volts through a load, such as a resistance element shown in dashed outline in FIG. 2B. If desired, the external load connected to the terminal B can include a clamping diode returned to a negative reference potential such as three volts. The emitter electrode is normally returned to a more positive potential, such as ground, as shown in dashed line. In some applications, the terminals B and C of several inverters are connected in series between ground and the negative potential to provide a NAND gate. The base of the electrode is connected to a positive biasing potential through a resistance element 202 that normally maintains the transistor 200 in a nonconductive condition. The base is also coupled to an input terminal A. In the rectangle forming the inverter logic symbol shown in FIG. 2A, the terminal C connected to the emitter of the transistor 200 is indicated by a darkened triangle and is always disposed in alignment with an output lead extending to the collector terminal B. The lead to the base of the terminal B can appear on either side of the rectangle in the logic diagram.

Figures 3A, 3B:
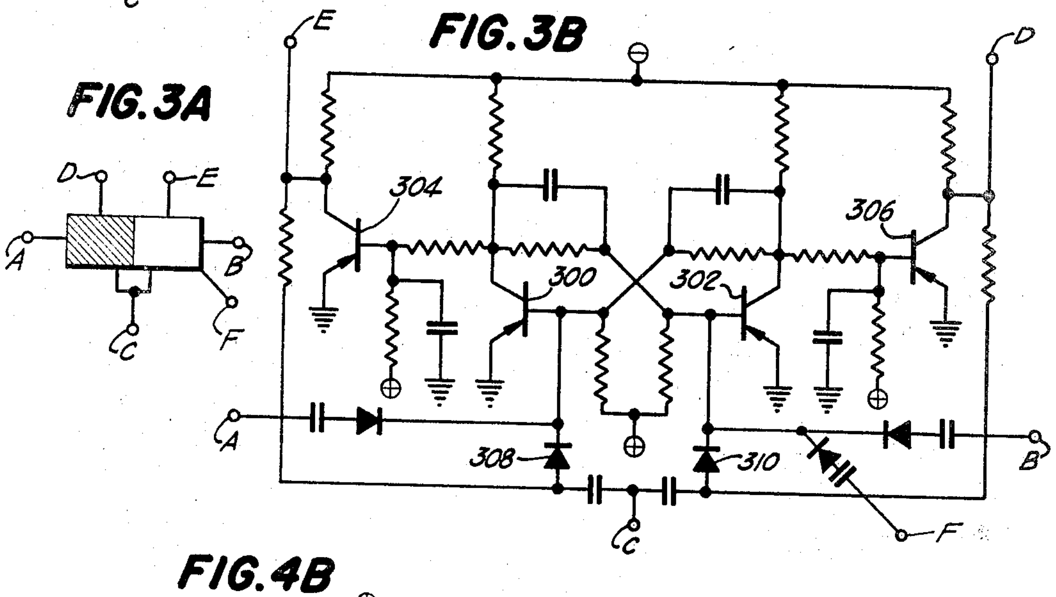

The logic symbol for a representative flip-flop is shown in FIG. 3A, and a typical circuit represented by this symbol is shown in FIG. 3B. The flip-flop includes a pair of cross-coupled transistors 300 and 302 forming a bistable circuit and a pair of output transistors 304 and 306. In the reset condition of the circuit representing a binary "0," the output transistor 306 and the flip-flop transistor 300 are in a conductive condition. The remaining two transistors 302 and 304 are in a nonconductive condition. This means that when the flip-flop is in a reset or "0" representing condition, the conductive transistor 306 applies a more positive potential to an output terminal D and a more negative potential is supplied to an output terminal E. The ground potential applied to the terminal D is represented by the shaded portion of the rectangle forming the logic symbol shown in FIG. 3A, and the negative potential applied to the output terminal E is represented by the open section of this rectangle. In the logic diagram, the logic symbol for the flip-flop can appear in reversed or inverted position.

When the flip-flop is to be set, a positive-going signal is applied to an input terminal A and is coupled through a diode to the base of the transistor 300. This places its base at a positive potential with respect to its emitter and places this transistor in a nonconductive condition. When the transistor 300 is placed in a nonconductive condition, the potential applied to the base of the transistor 302 is driven in a negative direction to place this transistor in a conductive state. The shift in the conductive states of the two transistors 300 and 302 places the transistor 306 in a nonconductive condition and places the transistor 304 in a conductive condition. When the transistor 306 is in a nonconductive condition, the potential of the output terminal D drops to a more negative potential, and the potential at the output terminal E rises to a more positive potential when the transistor 304 is placed in conduction. The flip-flop can be restored to its reset or "0" representing condition by the application of a positive-going signal to either of a pair of input terminals B and F. A complementing input terminal C is coupled to the base electrodes of both of the transistors 300 and 302 through a pair of diodes 308 and 310 so that the application of a positive-going pulse to this terminal shifts the flip-flop from its existing state to its alternate stable state.

Figure 4B:
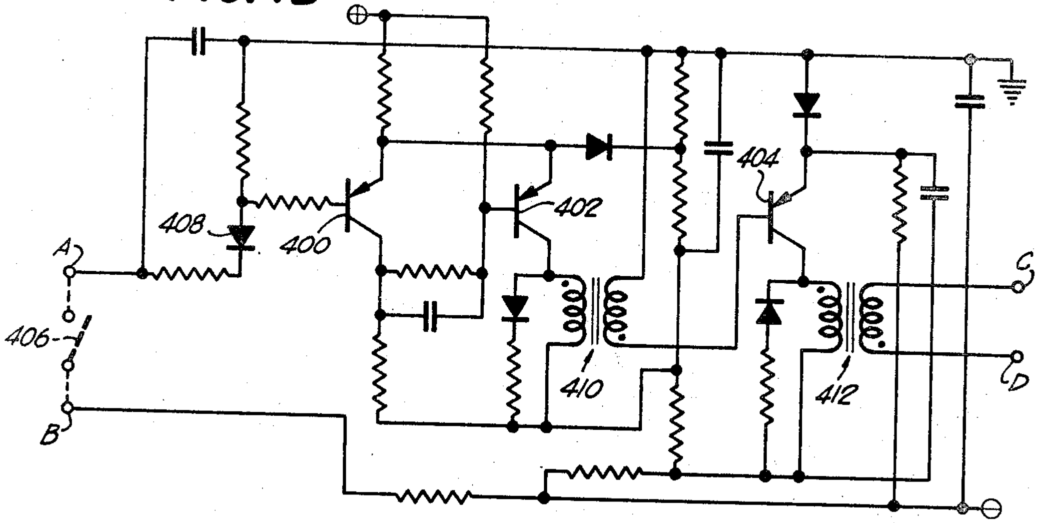
Figure 4A:
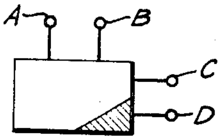

FIG. 4A of the drawings illustrates a logic symbol for a pulse generator, and FIG. 4B illustrates a circuit diagram for a typical pulse generator represented by the logic symbol. In general, when a pair of terminals A and B are momentarily connected together, the pulse generator supplies a negative-going pulse to an output terminal C or a positive-going pulse to an output terminal D.

Referring more specifically to the circuit diagram shown in FIG. 4B, the pulse generator includes three transistors 400, 402, and 404 of which only the transistor 402 is in a conductive state in the normal condition of the pulse generator. When the input terminals A and B are connected together, as by the closure of a switch 406, a more negative potential is forwarded through a diode 408 to the base of the transistor 400 to place this transistor in conduction. When the transistor 400 is placed in a conductive state, a more positive potential is applied to the base of the transistor 402 to place this transistor in a nonconductive state.

When the transistor 402 is placed in a nonconductive state, the termination of current flow through the primary winding of a transformer 410 induces a negative-going pulse in a secondary winding which is applied to the base of the normally nonconductive transistor 404. This places the transistor 404 in conduction so that current flows through the primary winding of a pulse transformer 412. Since the base of the transistor 404 receives only a momentary pulse from the pulse transformer 410, it returns to a nonconductive state and terminates the flow of current through the primary winding of the pulse transformer 412. If the output terminal C is grounded, the current flow through the primary winding of the pulse transformer 412 when the transistor 404 is placed in conduction provides a positive-going pulse at the output terminal D. Alternatively, if the output terminal D is grounded or connected to a source of reference potential, the flow of current through the primary winding of the pulse transformer 412 provides a negative-going pulse at the output terminal C. Oppositely poled pulses are produced at the terminals C and D due to the collapse of the primary field of the transformer 412 when the transistor 404 returns to a nonconductive state. The transistors 400 and 402 return to normal conditions of conduction when the switch 406 is opened.

Figures 5A, 5B:
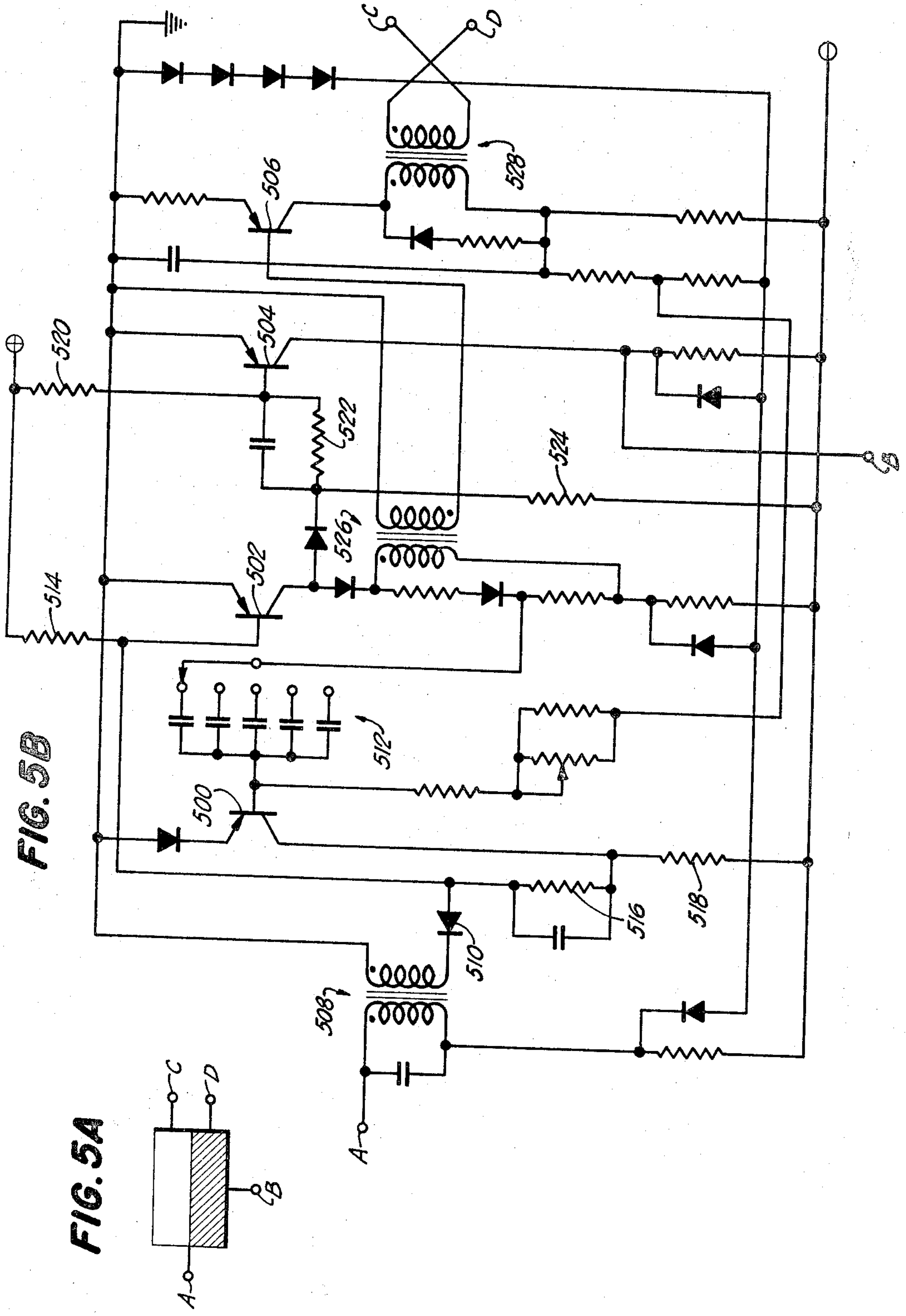

FIG. 5A of the drawings illustrates a logic symbol for a monostable circuit or delay circuit, and a typical circuit corresponding to this symbol is illustrated in FIG. 5B. In general, the monostable circuit is controlled by an input signal applied to an input terminal A to produce a steady state negative output signal at an output terminal B for a selected period of time. The duration of the negative-going output signal at the terminal B is independent of the duration of the signal applied to the input terminal A. This circuit also supplies either a positive-going pulse at the terminal D or a negative-going pulse at a terminal C at the termination of the delay interval.

Referring now more specifically to the monostable circuit shown in FIG. 5B, this circuit includes four transistors 500, 502, 504, and 506, two of which, 500 and 504, are normally in a conductive condition. The conductive transistor 504 normally maintains a more positive or a potential approaching ground at the output terminal B as indicated by the shading in the lower portion of the rectangle forming the logic symbol illustrated in FIG. 5A. When a negative-going signal is applied to the terminal A, a pulse transformer 508 couples the negative-going signal through a diode 510 to the base of the transistor 502 to bias this base negative relative to its grounded emitter. This places the transistor 502 in conduction so that a positive-going pulse is coupled through a selected one of a plurality of timing condensers 512 to the base of the conductive transistor 500. This places the transistor 500 in a nonconductive condition. When the transistor 500 is placed in a nonconductive condition, a voltage divider including a plurality of resistance elements 514, 516, and 518 applies a steady state negative potential to the base of the transistor 502 to hold this transistor in a conductive condition.

When the transistor 502 is placed in a conductive condition, an intermediate point on a voltage divider including a plurality of resistance elements 520, 522, and 524 is returned to ground potential, and a more positive potential is applied to the base of the normally conductive transistor 504 so that this transistor is placed in a nonconductive condition. This places a negative potential on the output terminal B. The conductive transistor 502 also pulses the primary winding of a transformer 526. However, the polarity of the output pulse developed in the secondary winding of this transformer biases the base of the normally nonconductive transistor 506 in a positive direction and does not change the nonconductive state thereof.

The delay of the monostable circuit is determined by the selection of one of the plurality of capacitors 512 and the resistance of the elements connected to the base of the transistor 500. After a delay interval determined by the RC time constant of these components, the base of the transistor 500 drops to a negative potential relative to its emitter, and this transistor is placed in a conductive condition. When the transistor 500 is placed in a conductive condition, the negative potential is removed from the base of the transistor 502, and this transistor returns to a nonconductive state so that the base of the transistor 504 is driven in a negative direction relative to its emitter to place this transistor in a conductive condition. This terminates the application of the negative potential to the output terminal B.

In adition, the termination of current flow through the transistor 502 is effective through the pulse transformer 526 to couple a momentary negative-going pulse to the base of the transistor 506. This places this transistor in a conductive condition so that current flows through the primary winding of a pulse transformer 528. If the output terminal D is grounded, the flow of current through the primary winding of the pulse transformer 528 produces a negative-going pulse at the output terminal C. Alternatively, if the output terminal C is grounded or connected to a reference potential, the secondary winding of the transformer 528 produces a positive-going pulse at the output terminal D.

Thus, the monostable circuit provides a negative-going signal at the output terminal B persisting for the duration of the time delay of the monostable circuit, and the terminals C and D selectively provide oppositely poled pulses at the end of this delay interval. In the logic diagram, only the terminals of the logic symbol that provide output signals that are used are shown.

Figures 6A, 6B:
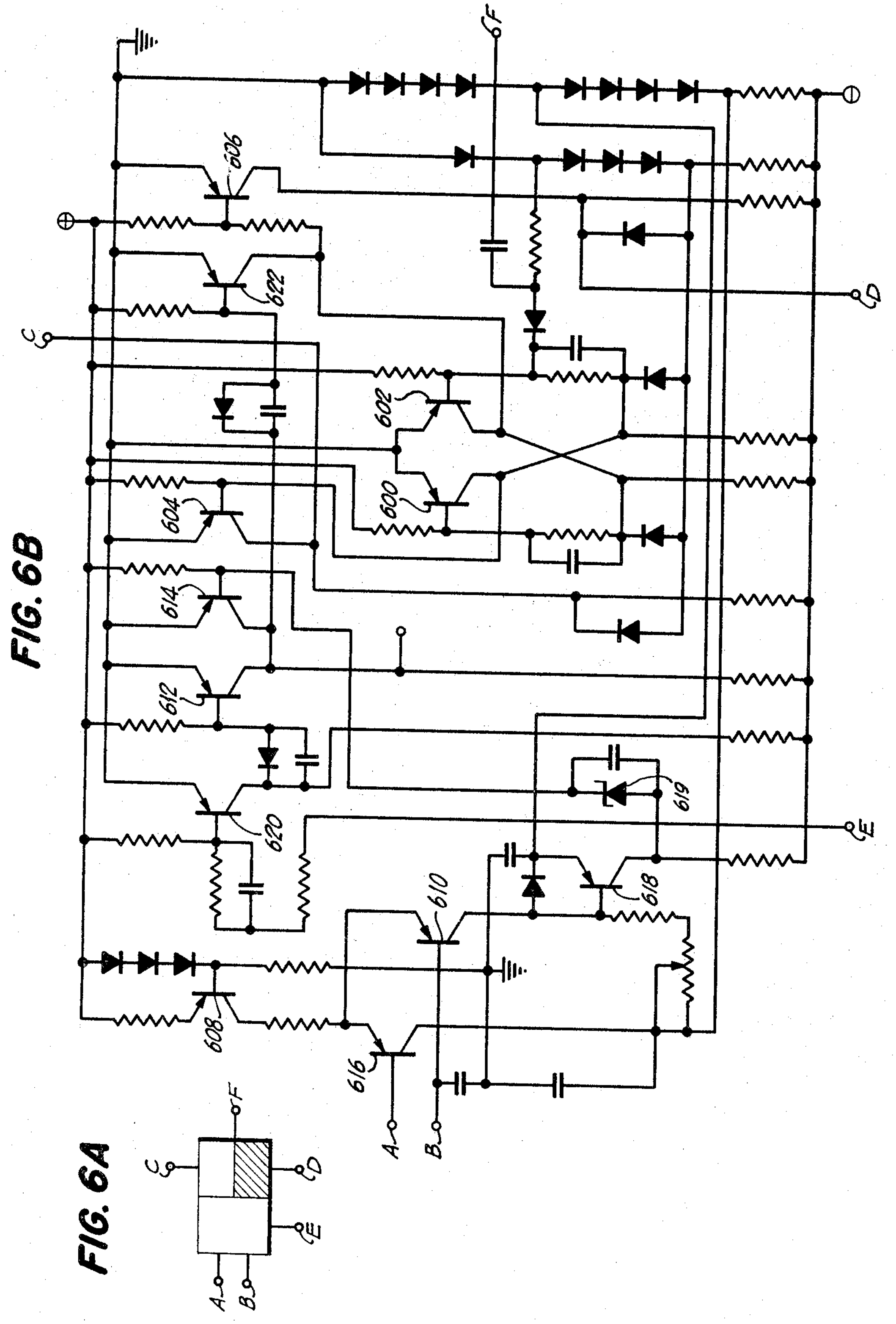
Figure 7:
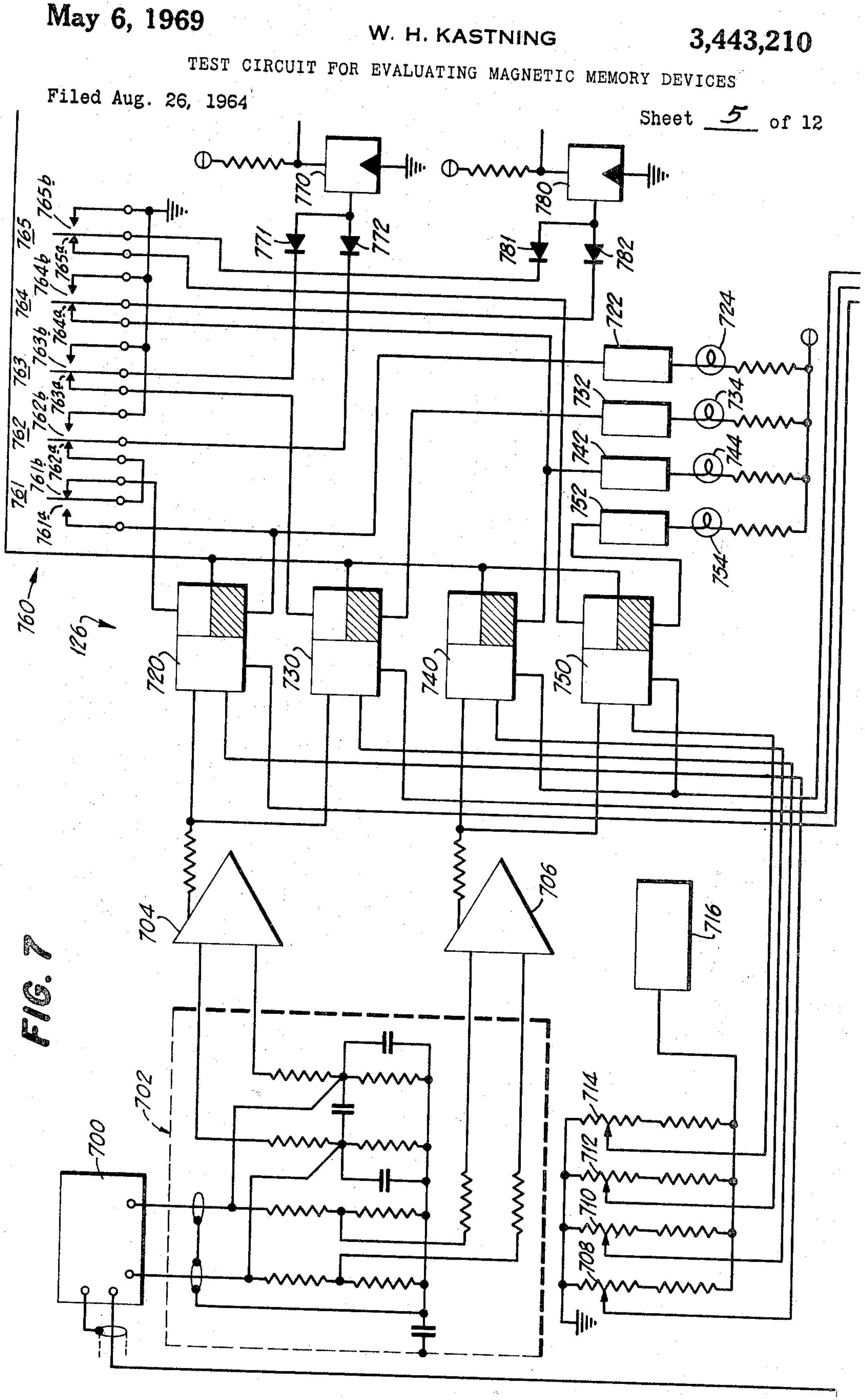
Figure 8:
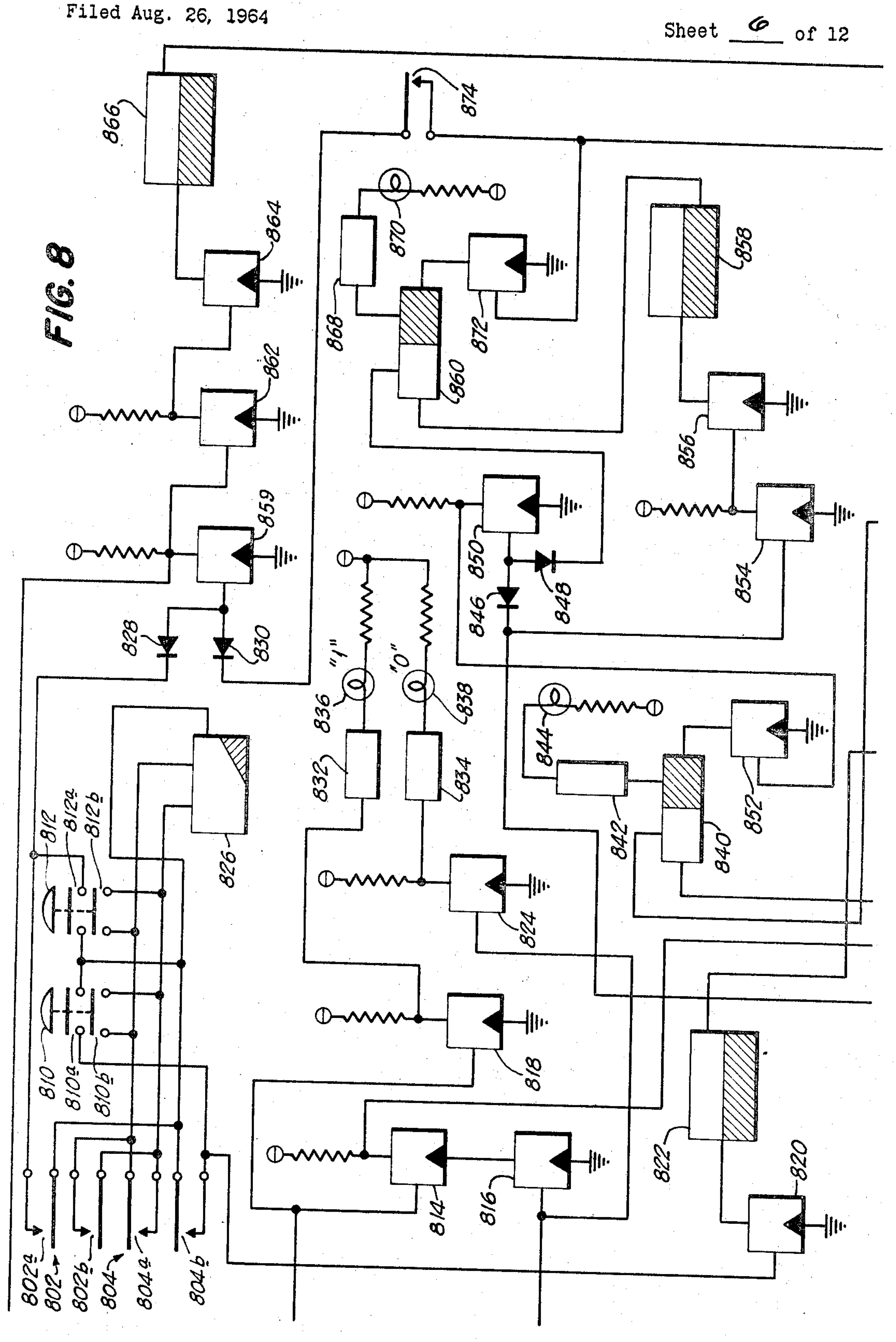

FIG. 6A of the drawings illustrates a logic symbol for a detector unit or slicer flip-flop, and FIG. 6B illustrates a representative circuit corresponding to this symbol. In general, the detector unit comprises a difference amplifier having a gate or strobe input for selectively setting a storage flip-flop in dependence on the relation between the values of an unknown input signal and a reference potential.

In the representative circuit shown in FIG. 6B, a pair of transistors 600 and 602 are cross-coupled to provide a bistable or flip-flop circuit in which the transistor 602 is reset to a normal nonconductive condition by the application of a positive-going pulse to a reset terminal F. In this condition, a first output transistor 604 is in a nonconductive condition to apply a negative potential to an output terminal C, and a second output transistor 606 is normally in a conductive condition to apply a more positive output signal to a terminal D. These normal output potentials are represented by the shaded and open right-hand portions of the block forming the logic symbol illustrated in FIG. 6A. In the normal condition of the circuit, a plurality of additional transistors 608, 610, 612, 614, 616, and 618 are in a conductive condition. The transistor 608 provides a constant current source for the conductive transistors 610 and 616.

A negative reference potential establishing one operating parameter for the difference amplifier portion of the circuit is applied to an input terminal B, and the unknown input potential is applied to a terminal A. As the input signal applied to the terminal A becomes more negative than the reference potential applied to the terminal B, the conduction through the transistor 616 increases and the conduction through the transistor 610 decreases. If this unbalance persists for a time-voltage product on the order of 50 milli-nanoseconds, for example, an unbalance voltage of five millivolts persisting for ten nanoseconds, the base of the transistor 618 is driven more negative so that conduction through this transistor increases. This increased conductivity drives a Zener diode 619 to apply a positive-going pulse to the base of the transistor 614.

The positive-going pulse applied to the base of the transistor 614 terminates conduction through this transistor. The change in conduction through the transistor 614 is not effective to change the setting of the storage flip-flop unless and until such time as the detector unit is enabled or strobed. This permits the value of the unknown potential applied to the input terminal A to be determined at a particular point in a time cycle.

More specifically, when the relative values of the potentials applied to the terminals A and B are to be evaluated or compared, a negative-going pulse is applied to a strobe input terminal E. This places the transistor 620 in a conductive condition so that the base of the transistor 612 is driven positively with respect to its emitter. This terminates conduction through this transistor and removes the clamp on the transistor 614. The conduction through this transistor is terminated in the manner described above when the magnitude of the voltage applied to the terminal A exceeds, in a negative direction, the level set by the reference potential applied to the terminal B.

The termination of conduction through both the transistors 612 and 614 applies a more negative potential to the base of a transistor 622. This places this transistor in conduction so that the transistor 602 is placed in a conductive condition and the transistor 600 is placed in a nonconductive state. The change in the conductive state of the transistor 600 applies a more negative potential to the base of the transistor 604 so that the potential applied to the output terminal C rises to a more positive value. The conduction through the transistors 602 and 622 biases the base of the transistor 606 positive with respect to its emitter so that conduction through this transistor is terminated. This applies a more negative potential to the output terminal D. Thus, in response to the receipt of a signal at the input terminal A exceeding the preset level, the conductive state of the storage flip-flop including the transistors 600 and 602 is reversed, and the potentials applied to the output terminals C and D are reversed in accordance therewith.

When the negative enabling pulse is removed from the strobe terminal E, the transistor 620 returns to a nonconductive state, and the transistor 612 returns to a conductive state. This, in turn, returns the transistor 622 to a nonconductive state. The setting of the flip-flop including the transistors 600 and 602 is not changed. Since the transistor 602 remains in a conductive state, the transistor 606 remains in a nonconductive state. When the potential applied to the input terminal A drops below the preset level, the transistors 610, 614, 616, and 618 return to their normal states of conductivity. The storage flip-flop is reset or cleared by the application of a positive-going pulse to the reset terminal F. When the flip-flop is reset to a condition in which the transistor 600 is in a conductive state and the transistor 602 is in a nonconductive state, the transistor 604 returns to a nonconductive state, and the transistor 606 returns to a conductive state so that the output terminals C and D provide their normal output potentials.

Referring now more specifically to FIGS. 7–13 of the drawings, therein is illustrated in logic schematic form the system 120 for automatically testing the magnetic core element 100. This system can be used in conjunction with a manual fixture for testing individual magnetic cores 100, but preferably is operated in conjunction with the automatic core handling equipment or apparatus 122 to provide means for testing a large quantity of the cores 100 without requiring manual intervention.

Figure 9:
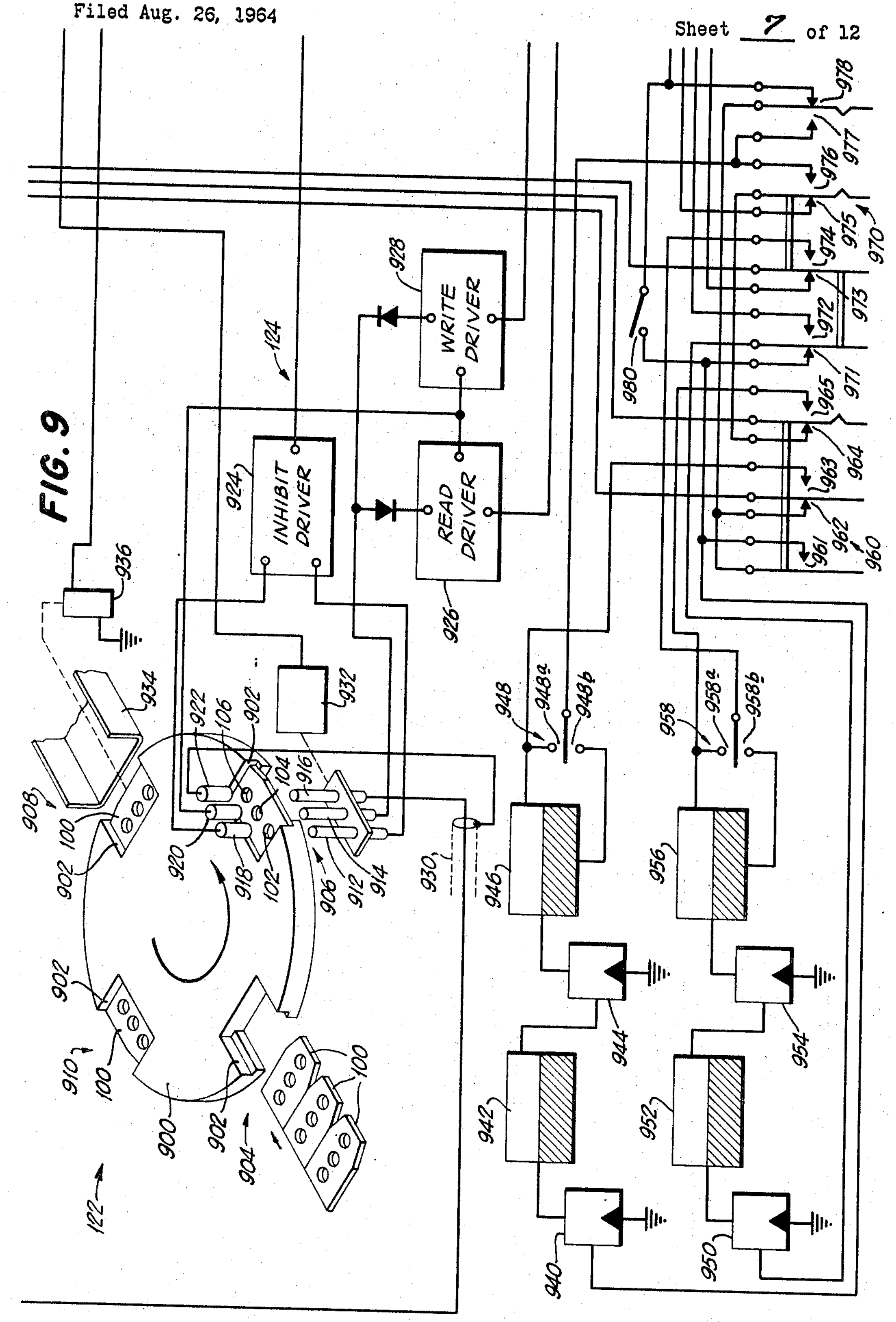
Figure 10:
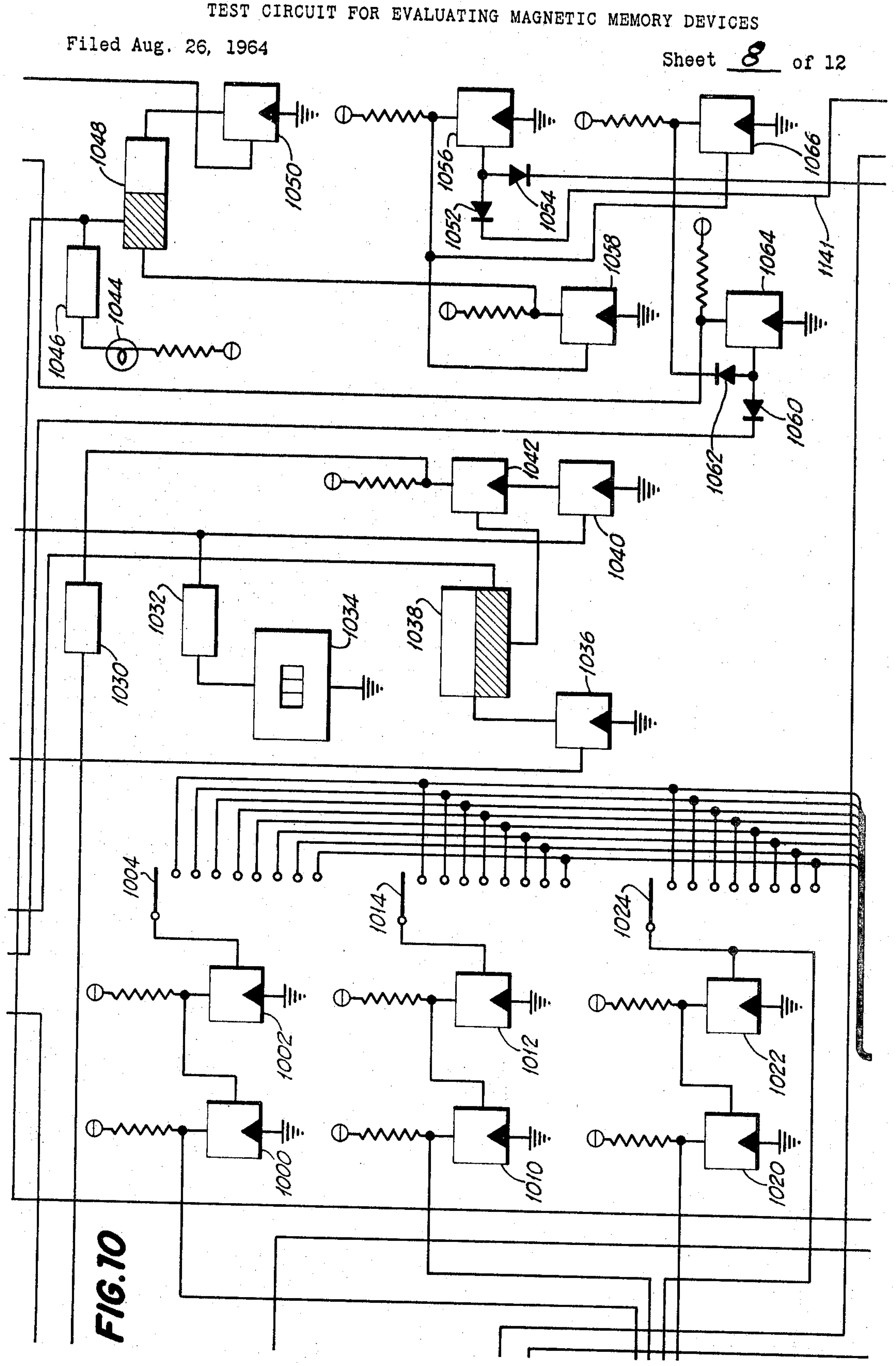
Figure 11:
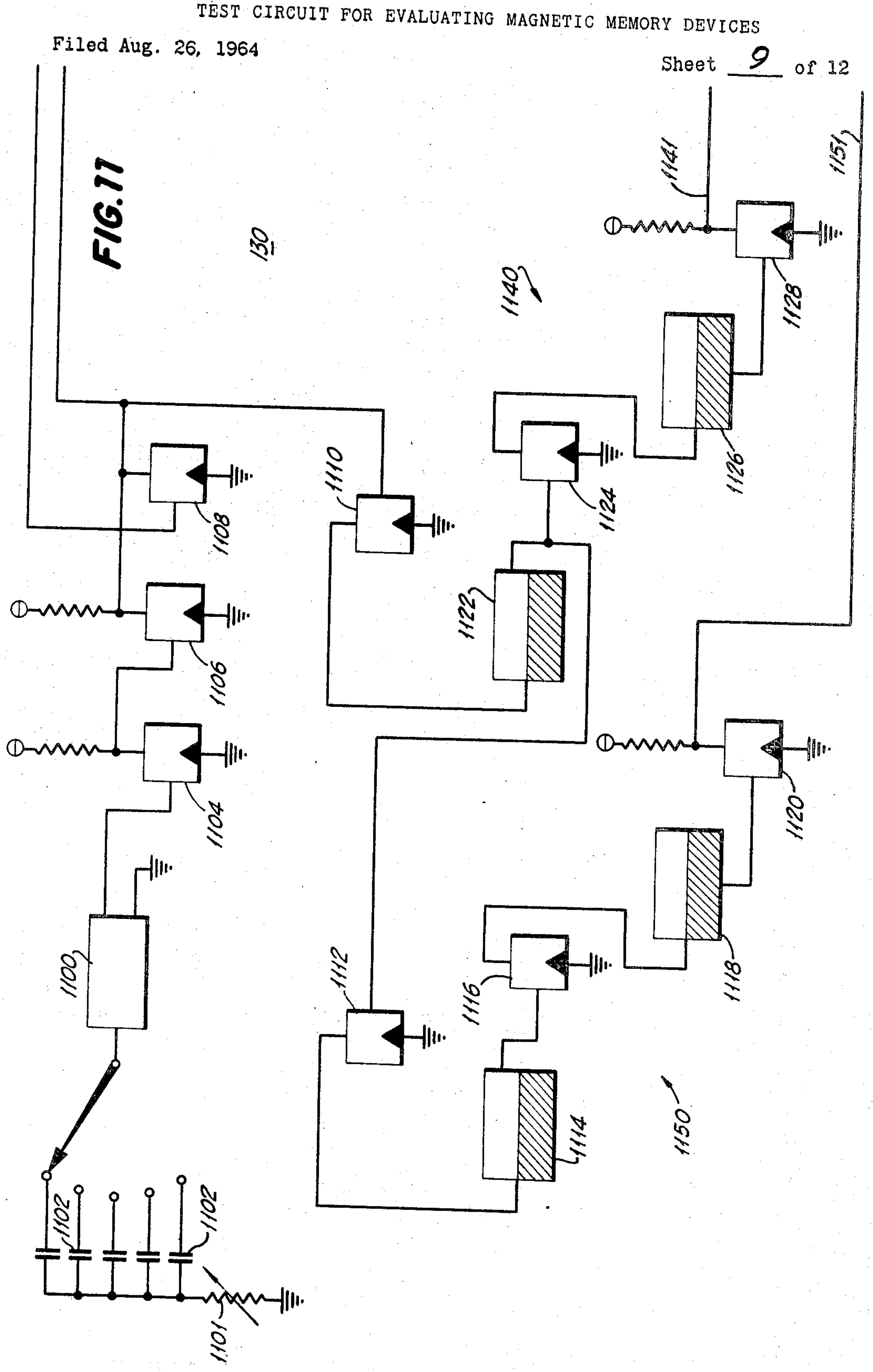

The automatic core handling equipment 122 is schematically illustrated in FIG. 9 of the drawings and comprises a turntable 900 having a plurality of core receiving recesses or supporting means 902 formed in the periphery thereof. The turntable 900 is successively rotated or indexed by mechanical drive means (not shown) to transport cores 100 supplied at a feeding station 904 through a testing station 906, a reject station 908, and an accept station 910. In one system 120 constructed in accordance with the present invention, the core handling equipment 122 is capable of processing thirty cores per minute.

The feeding station 904 includes suitable means for feeding individual magnetic cores 100 from a bulk supply thereof to successive ones of the recesses 902. The turntable 900 advances the cores to the testing station 906 in which suitable means synchronized with the rotation of the turntable 900 are provided for inserting three electrically conductive probes 912, 914, and 916 through the openings 102, 104, and 106, respectively, in the magnetic core 100 in test position to be received in three sockets or female connectors 918, 920, and 922, respectively. The probe 912 and receptacle 918 provide a single turn winding which links the opening 102 and is coupled to the output of an inhibit driver 924 forming one of the core drivers 124. The probe 914 and the receptacle 920 provide a single turn winding linking the opening 104 and coupled to both a read driver 926 providing negative drive pulses and a write driver 928 providing positive drive pulses. The probe 916 and the receptacle 922 provide a single turn sense winding for the core 100 and are connected over a coaxial cable 930 to the input of an amplifier 700 in the control circuit 128. A switch assembly 932 mechanically coupled to the probes 912, 914, and 916 supplies control signals to the circuit 128 indicating the inserted and retracted position of the probes 912, 914, and 916.

When the testing operation at the station 906 has been completed, the probes 912, 914, and 916 are retracted from the receptacles 918, 920, and 922, and the turntable 900 is indexed to feed the next core 100 to be tested to the feeding station 906 and to advance the previously tested core 100 to the reject station 908. This station includes a conveying means or chute 934 for receiving magnetic cores 100 discharged from the turntable 900. A rejection mechanism of suitable construction at the station 908 is controlled by a solenoid 936. The solenoid 936 is controlled by data storing means in the control circuit 128 to reject the core previously tested at the station 906 if this core failed to satisfy the evaluation standards. If the core 100 previously tested at the station 906 has been determined to be satisfactory, the solenoid 936 is not operated, and the core is subsequently removed at the accept station 910 by suitable means (not shown) when the turntable 900 is next advanced. This cyclic operation of the automatic core handling equipment 122 continues without interruption so that successive magnetic cores or transfluxor elements 100 are tested at the station 906 and either accepted or rejected by movement through the sorting or classifying means provided by the subsequent stations 908 and 910.

As set forth above, the program generator 130 (FIGS. 11–13) provides means for controlling the performance of sequential testing operations on the magnetic core 100 at the testing station 906. In general, the program generator 130 provides signals of variable duration and position within eight distinct time slots in a recurring or repetitive time frame. These signals are selectively supplied to the detectors 126 to control the enabling thereof and to the three drivers 924, 926, and 928 to supply different patterns of signals to the core under test 100. The program generator 130 also includes means for supplying synchronizing signals to a visual display means, such as an oscilloscope, by which various signals present in the system can be visually inspected.

The program generator 130 includes a clock pulse source 1100 of conventional design having an output coupled to the input of an inverter 1104. The pulse repetition rate of the source 1100 can be set to any desired rate by the selection of one of a plurality of timing capacitors 1102 and the adjustment of a variable resistance element 1101. The clock pulses supplied by the source 1100 are coupled through the inverter 1104 and an additional inverter 1106 to be supplied to the input of a three-stage binary counter 1200 which includes three inverters 1202, 1206, and 1210 coupled by a pair of pulse transformers 1204 and 1208 and three serially connected flip-flops 1212, 1214, and 1216. The outputs of the flip-flops 1212, 1214, and 1216 are coupled to the input of a binary decoder 1218 having eight output leads on which negative-going signals appear in sequence in accordance with the settings of the counter 1200. The binary decoder 1218 can be of any suitable construction and can comprise eight output transistors, the inputs of which are AND gated to the six output signals from the flip-flops 1212, 1214, and 1216. The binary counter 1200 is repetitively operated through a counting cycle in which the eight output leads from the decoder 1218 are provided with negative signals in sequence to define eight distinct time slots in which the various operations of the system 120 are performed.

As set forth above, the clock pulse source 1100 can be operated at any desired frequency, and the duration of each of the individual time slots defined by the negative pulses at the output of the binary decoder 1218 can be adjusted to have any suitable value. In one testing system 120 constructed in accordance with the present invention, the eight time slots each have a duration on the order of fifty microseconds. The negative-going pulses provided at the output of the binary decoder 1218 can be used without modification for some purposes, such as the wide strobing of the detectors 126. However, in most instances, it is desirable to provide pluses of a variable width occurring at different positions within any selected ones of the eight time slots. As an example, it is frequently desirable to delay enabling or strobing the detectors 126 until after the core drivers 124 have been enabled so as to prevent response of the detectors 126 to spurious signals. To provide these pulses of different widths and positions within the individual time slots, the program generator 130 includes a primary timing channel 1140 providing a primary signal of a given width and position within each time slot and a secondary timing channel 1150 providing a secondary signal of a different position and duration within each time slot. The primary and secondary signals are AND gated with selected combinations of the eight time slot signals to provide the output pulses used in various parts of the system 120.

The primary pulse assembly 1140 includes an inverter 1110 that is supplied with clock pulses from the output of the inverter 1106. The inverter 1110 sets a monostable delay circuit 1122 so that after a given delay interval, such as one on the order of from .25 to 2.5 microseconds, a negative-going pulse is applied to the input of an inverter 1124. This pulse is coupled through the inverter 1124 to set a duration controlling monostable circuit 1126 so that a negative signal of a given duration, such as three microseconds, set by the selected timing components of this circuit is applied to the input of an inverter 1128. This inverter forwards a positive-going signal to a common primary signal conductor 1141. This positive-going pulse begins a fixed time interval after the beginning of each of the time slot pulses and has a selected duration less than the duration of the time slot pulse. The delay of the circuit 1122 is long enough to insure that the counting circuit 1200 and the binary decoder 1218 reach a stable condition representing the next time slot before the primary or secondary pulses begin.

The secondary pulse or signal channel 1150 includes an inverter 1112, the input of which is coupled to the pulse output of the monostable circuit 1122. The negative-going pulse provided at the output of the circuit 1122 controls the inverter 1112 to set an additional delay monostable circuit 1114. The circuit can also be adjusted to provide a delay on the order of, for instance, from .25 to 2.5 microseconds. At the end of this delay interval, a negative-going pulse is coupled through an inverter 1116 to set a duration controlling monostable circuit 1118. This circuit can be provided with any delay desired for the secondary pulse, such as two microseconds. Accordingly, when the circuit 1118 is set, a fixed duration negative pulse is applied to the input of an inverter 1120. This controls the inverter 1120 to provide a positive-going signal on a common secondary bus or conductor 1151. This pulse begins an interval following the beginning of each of the time slot signals a period determined by the delay for which the two delay monostables 1122 and 1114 are set and has a duration equal to the delay interval for which the monostable circuit 1118 is set. The signals on the primary conductor 1141 and the secondary conductor 1151 are AND gated with selected time slot signals supplied by the binary decoder 1218 to provide pulses of different positions and durations in desired ones of the time slots for controlling the enabling of the core drivers 124 and the enabling of the detectors 126.

As an example, the program generator 130 includes an inhibit channel 1220 for selecting the time slot or slots and the positions and durations within the selected time slots of the repetitive time frame in which the inhibit driver 924 is to be rendered effective to supply an inhibit pulse to the core 100 under test. The channel 1220 includes an input inverter 1226 whose input is coupled through eight diodes 1240 to eight manually operable switches 1242, each of which can be closed to select a different one of the eight time slot output conductors from the binary decoder 1218. If, for example, the inhibit driver 924 is to be rendered effective in the third and fourth time slots, the third and fourth switches 1242, considered downwardly from the top, are closed to connect the input of the inverter 1226 to the output conductors from the decoder 1218 on which negative-going pulses appear in the third and fourth time slots. During these two time slots, the inverter 1226 is rendered conductive to apply an enabling potential to a diode 1222 froming one input to an AND gate connected to the input of an output inverter 1221, th output of which is connected to the gate or enabling input of the inhibit driver 924.

To provide means for selecting the duration and position of the enabling signal applied to the inhibit driver 924 within the selected third and fourth time slots, a diode 1224 forming the other input to the AND gate for the inverter 1221 is connected to a switch 1228. If the enabling pulse of the inhibit driver 924 is to have secondary timing, the switch 1228 is operated to close a pair of contacts 1228*a*. Alternatively, if the inhibit driver 924 is to be provided with an enabling pulse having primary timing, the switch 1228 is operated to close a pair of contacts 1228b. Assuming that the driver 924 requires primary timing, the contacts 1228b are closed so that the diode 1224 receives an enabling potential in all eight of the time slots, which enabling pulse is delayed slightly from the beginning of the time slot by the delay interval of the monostable 1122 and has a duration determined by the setting of the monostable 1126. Thus, during the third and fourth time slots selected by the two operated switches 1242 and during the primary pulse interval determined by the closed contacts 1228b, both of the diodes 1222 and 1224 receive enabling potentials, and the transistor 1221 is returned to a conductive state so that a negative-going pulse is forwarded to the gate input of the inhibit driver 924. This controls the inhibit driver 924 to supply an inhibit pulse to the core 100 under test in the third and fourth time slots at a delayed position within these two time slots and for a duration determined by the timing of the primary pulses on the conductor 1141.

Figure 12:
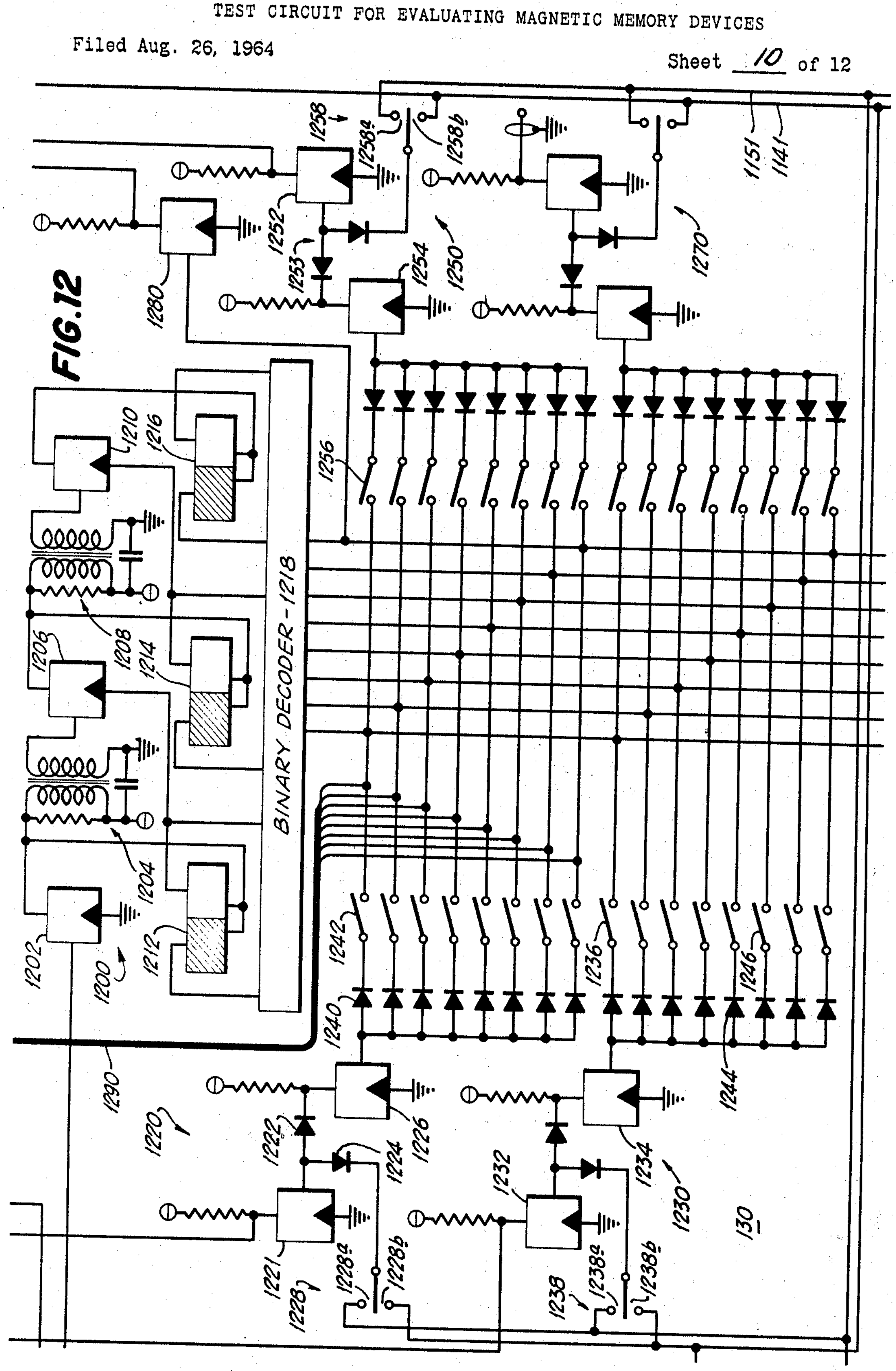
Figure 13:
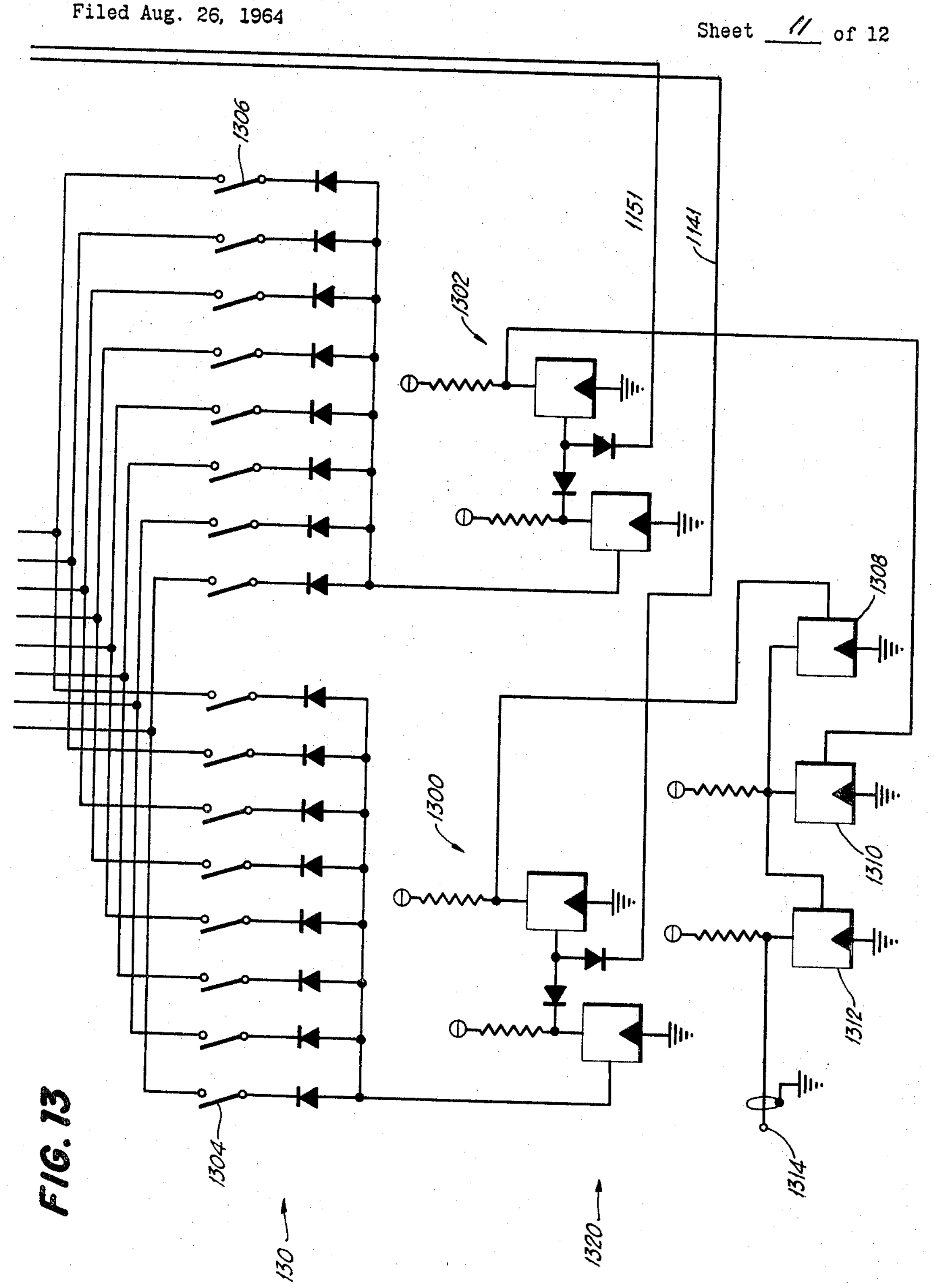

The program generator 130 also includes a write channel 1250 having an output inverter 1252 connected to the gate or enabling input of the write driver 928. An input inverter 1254 is connected to desired ones of the eight time slot conductors by eight switches 1256 to select the time slots in which the write driver 928 is to be rendered effective. The inverter 1254 selectively enables one input of an AND gate 1253 connected to the input of the inverter 1252 in the selected time slots. The other input to the AND gate is selectively enabled in either primary or secondary timing under the control of a switch 1258 which is operable to close a pair of contacts 1258a to select secondary timing and to close a pair of contacts 1258b to select primary timing. As an example, if the write driver 928 is to deliver write pulses to the connected probe 914 in the first and third time slots with secondary timing, the first and third switches 1256, considered from the top as shown in FIG. 12, control the inverter 1254 to enable one input to the AND gate 1253 in the first and third time slots, and the switch 1258 is operated to close the contacts 1258a to enable the other input to the AND gate 1253 during the secondary pulse in each of the eight time slots. Thus, the inverter 1252 provides a negative enabling potential to the write driver 928 with secondary timing in only the first and third time slots.

The program generator 130 also includes a read channel 1230 which is substantially identical to the channels 1220 and 1250 and which includes an output inverter 1232 connected to the strobe or enabling input of the read driver 926. One input to an AND gate for the inverter 1232 is selectively enabled by an inverter 1234 controlled by the eight switches 1236 which selectively connect the inverter 1234 to the eight time slot buses. The other input to the AND gate for the inverter 1232 is controlled by a switch 1238 which selectively closes either of two pairs of contacts 1238a or 1238b to supply enabling signals with either primary timing from the conductor 1141 or secondary timing from the conductor 1151. Thus, if the second and fifth switches 1236, considered downwardly from the uppermost switch, are closed, and the switch 1238 is actuated to close the contact 1238b, the read driver 926 is enabled during the second and fifth time slots with signals having primary timing. The program generator 130 includes a fourth assembly 1270 identical to the assemblies 1220, 1230, and 1250, which is not used in the illustrated testing system 120.

The program generator 130, in addition to providing means for strobing or enabling the core drivers 124 and the detectors 126 in selected ones of the time slots in the repetitive time frame, includes means for synchronizing the operation of a visual display means, such as an oscilloscope. It is frequently desirable to provide a visual display of the core response signals or of the drive or strobe signals to check the operation of the testing system 120, as well as to facilitate the adustment thereof. These synchronizing means comprise an assembly 1320 including a primary channel assembly 1300 and a secondary channel assembly 1302, each having an individually associated set of manually operated switches 1304 and 1306 for coupling the channels 1300 and 1302, respectively, to the eight time slot output conductors from the binary decoder 1218. The assemblies 1300 and 1302 are identical to the assemblies 1220, 1230, 1250, and 1270 except the assembly 1300 is permanently connected to the primary bus 1141, and the assembly 1302 is permanently connected to the secondary conductor 1151. Thus, the assembly 1300 can provide signals in any of the eight time slots with primary timing, while the assembly 1302 can provide output signals in any of the eight time slots with secondary timing.

The output of the assembly 1300 is connected to the input of an inverter 1308, and the output of the assembly 1302 is connected to the input of an inverter 1310. The two inverters 1308 and 1310 provide an OR gate, the output of which is coupled to the input of an inverter 1312. The output of the inverter 1312 is connected to a terminal 1314 adapted to be connected to, for instance, the external synch signal input of an oscilloscope. The inverter 1312 is controlled by the inverters 1308 and 1310 to provide negative-going synchronizing signals to the terminal 1314 in any of the time slots selected by the operation of the switches 1304 and 1306 with either primary or secondary timing.

Referring now more specifically to the plurality of detectors 126 (FIG. 7), this group includes four detectors or slicer flip-flops 720, 730, 740, and 750. The detectors 720 and 730 are used to evaluate "1" characteristics of the core 100 under test, and the detectors 740 and 750 are used to evaluate "0" characteristics of the core 100. The inputs to the detectors 720, 730, 740, and 750 are coupled to the sense probe 916 in the core handling apparatus 122.

More specifically, the sense probe 916 is connected over the coaxial cable 930 and the amplifier 700 to an attenuation network 702. Because of the relatively large magnitude of the output potential developed in testing "1" characteristics, the attenuation network 702 reduces the magnitude of the "1" response signal by a factor of ten and supplies this potential to an input of an amplifier 704, the output of which is connected to the unknown voltage inputs of the two "1" evaluating detectors 720 and 730. A substantially unattenuated output is supplied by the network 702 to the input of an amplifier 706, and the output of this amplifier is connected to the unknown or variable voltage input of the "0" evaluating detectors 740 and 750.

To provide reference potentials to the detectors 720, 730, 740, and 750 against which the core response potentials are compared, a stabilized negative potential source 716 energizes a voltage dividing network including four manually adjustable potentiometers 708, 710, 712, and 714. The taps on the potentiometers 708 and 710 are connected to the reference potential inputs of the "1" evaluating detectors 720 and 730, respectively, and the output taps on the potentiometers 712 and 714 are supplid to the reference potential inputs of the "0" evaluating detectors 740 and 750. The potentiometers 708, 710, 712, and 714 are adjusted to different values in dependence on the type of test being performed on the magnetic core 100 and condition the detectors 720, 730, 740 and 750 for different responses to the unknown input potentials derived from the sense probe 916.

The control circuit 128 includes means for selecting and controlling both the time slots and the positions and durations within the selected time slots in which the detectors 720, 730, 740, and 750 are strobed or enabled by the time slot signals provided by the program generator 130. As an example, the "1" evaluating detectors 720 and 730 can be enabled for substantially the entire width of a time slot or for a substantially shorter time period of different duration variably positioned within a selected one or more of the time slots. Further, the two "1" evaluating detectors 720 and 730 can be enabled in different time slots. The "0" evaluating detectors 740 and 750 are always strobed or enabled in the same time slots but can be enabled for substantially the full width of any selected one of the time slots or for substantially shorter periods within any given group of time slots.

Referring now more specifically to the enabling or strobing signals for the "1" evaluating detector 720, the control circuit 128 includes a manually operable switch 1004 that can be operated to conect the input of an inverter 1002 to any one of the eight time slot output conductors from the binary decoder 1218, which conductors extend from the program generator 130 to the control circuit 128 over a cable 1290. The negative-going signal in the time slot selected by the switch 1004 places the connected inverter 1002 in a conductive condition so that an inverter 1000 connected to the output of the inverter 1002 supplies a negative-going signal in the selected time slot. This signal is normally forwarded over a circuit including a pair of normally closed contacts 978 on a switch 970 and a pair of normally closed contacts 962 on a switch 960 to the enabling or strobe input of the detector 720. Thus, the detector 720 is enabled for substantially the full duration of the selected time slot.

Similarly, the other "1" evaluating detector 730 can be provided with an enabling or strobing signal of substantially the entire duration of a selected one of the eight time slots under the control of a switch 1014 which is manually operable to connect the input of an inverter 1012 to any one of the eight time slot conductors. The output of the inverter 1012 is connected to the input of an inverter 1010 so that a negative-going signal is provided at the output of the inverter 1010 in the selected time slot. This negative-going pulse is coupled through a pair of normally closed contacts 975 on the switch 970 and a pair of normally closed contacts 964 on the switch 960 to be applied to the enabling or strobing input of the detector 730. Thus, this detector can be enabled for substantially the complete duration of the time slot selected by the switch 1014.

Similarly, the "0" evaluating detectors 740 and 750 can be enabled concurrently for substantially the full duration of a selected time slot. The strobe inputs of the "0" evaluating detectors 740 and 750 are normally connected to the output of an inverter 1020 through a pair of normally closed contacts 973 on the switch 870. The input of the inverter 1020 is connected to the output of an inverter 1022 whose input is connected to a manually operable switch 1024. The switch 1024 can be operated to connect the input of the inverter 1022 to any given one of the eight time slot output conductors from the binary decoder 1218. Thus, a negative strobing signal is concurrently applied to the strobe inputs of both of the "0" evaluating detectors 740 and 750 for substantially the entire duration of the selected time slot.

The control circuit 128 also includes means for supplying the detectors 720, 730, 740, and 750 with strobe signals at different positions within the selected time slots and having durations substantially shorter than the duration of a complete time slot. This control means includes two substantially identical delay channels. The first channel includes a monostable circuit 942 driven by an inverter 940 to supply a negative-going pulse to an inverter 944 at the end of the delay interval for which the monostable circuit 942 is adjusted. The inverter 944 drives a monostable circuit 946 to provide both a negative-going pulse output of approximately seventy nanoseconds duration at the end of the time delay of the circuit 946 or a steady state negative signal that persists throughout the duration of the delay interval of the monostable circuit 946. An output switch 948 can be operated to close a pair of contacts 948*a* to select the pulse output from the bistable circuit 946 or to close a pair of contacts 948*b* to select the steady state output from this circuit. The switch 948 can be connected to the strobe inputs of the "1" detectors 720 and 730 by closing two pairs of normally open contacts 976 and 977 on the switch 970.

The second delay channel includes two inverters 950 and 954 and two monostable timing circuits 952 and 956 which function in the same manner as the similar components in the first delay channel. The pulse output from the monostable circuit 956 can be applied to the strobe inputs of the detectors 740 and 750 by operating a switch 958 to close a pair of contacts 958*a* and by operating the switch 970 to close a pair of contacts 974. The steady state negative strobing signal having a duration equal to the delay period of the monostable circuit 956 can be selected by operating the switch 958 to close a pair of contacts 958*b*. These two delay channels can provide similar or different delay periods and can be driven from the same or different pulse sources.

The outputs of the storage flip-flops in the detectors 720, 730, 740, and 750 are supplied to "0" and "1" test result evaluating means in the control circuit 128 under the control of a bank of switch 760. By changing the settings of the switches in this bank, the detectors can be selectively rendered ineffective or their effect on the control circuit 128 can be changed in accordance with the nature of the tests to be performed on the cores 100. As an example, a pair of switches 761 and 762 in the band control the operability of the "1" detector 720 and its effects on the "1" test evaluating AND gate formed by two diodes 771 and 772 connected to the input of an inverter 770. When the detectors 720 and 730 are used to evaluate the "1" switching time of the core 100, the detector 720 operates as a maximum level detector and should not be set during the test. Accordingly, the switch 761 in the bank is operated to open a pair of contacts 761*b* and to close a pair of contacts 761*a* to connect the set output of the detector 720 to the cathode of the diode 772 over a circuit including a pair of normally closed contacts 762*a* on the switch 762. If the detector 720 is used as a minimum level detectors in a different test, the switch 761 is not operated, and the reset or "0" output of the detector 720 is connected to the diode 772 through the closed contacts 761*b* and 762*a*. The reset output of the detector 730 is connected to the cathode of the diode 771 over a circuit including a pair of normally closed contacts 763*a* on a switch 763.

A pair of diodes 781 and 782 in the input circuit to an inverter 780 provide an AND gate for evaluating the results of the "0" tests. This "0" evaluating AND gate is selectively connected to the "0" evaluating detectors 740 and 750 by two switches 764 and 765. More specifically, the set output of the detector 740 is connected to the diode 782 through a pair of normally closed contacts 764*a* on the switch 764. The diode 781 is connected to the reset output of the detector 750 over a circuit including a pair of normally closed contacts 765*a* on the switch 765.

The bank of switches 760 can also be operated to disconnect the four detectors 720, 730, 740, and 750 from the "0" and "1" evaluating AND gates. More specifically, the operation of the switches 762–765 to open tne contacts 762*a*–765*a* and to close the plurality of contacts 762*b*–765*b* applies ground to the diodes 771, 772, 781, and 782 and disconnects these diodes from the selected outputs of the detectors 720, 730, 740, and 750. This permits the system 120 to be checked and aids in adjusting the inputs to and the operation of the detectors 720, 730, 740, and 750 without controlling the operation of the remainder of the system.

To provide a visible indication of the set and reset conditions to which the detectors 720, 730, 740, and 750 are operated incident to each cycle of testing operations, the set outputs of the four detectors are connected to the inputs of four lamp amplifiers 722, 732, 742, and 752, respectively. The outputs of the amplifiers are connected to four indicating lamps 724, 734, 744, and 754, respectively. Since the inputs of the lamp amplifiers 722, 732, 742, and 752 are connected to the set or normally grounded outputs of the storage flip-flops in the detectors 720, 730, 740, and 750, the lamps 724, 734, 744, and 754 are not normally energized. These lamps are selectively energized in accordance with the settings of the plurality of detectors 126 and not only provide visible indications of a satisfactory completion of a test but also provide means for evaluating the causes or reasons for a test that is not satisfactorily completed.

As set forth above, the system 120 is capable of performing a number of different tests or sequences of tests on the magnetic core 100. To illustrate the operation of the entire system 120, one specific sequence of tests or test program that provides information for evaluating the magnetic and electrical characteristics of the cores 100 is described in detail. In this representative test program, the "1" response signal or voltage, shown as a waveform 2706 in FIG. 27, is evaluated for two characteristics. It is first evaluated to insure that its peak amplitude reaches a predetermined minimum value represented by a line 2708. The "1" response signal is also evaluated with regard to switch time by determining whether its amplitude has dropped below a level represented by a line 2710 within a known time interval. The test program also tests the disturbed "0" or "*d*0" response signal shown as a waveform 2700. The presence of a "*d*0" response is checked by determining whether it exceeds an amplitude represented by a line 2702. A second test is made to insure that, though present, the amplitude of the "*d*0" response signal does not exceed a given amplitude represented by a line 2704. This insures that a suitable differential is maintained between the peak amplitude of the "1" and the "*d*0" response signals to permit these core responses to be differentiated in the control circuits associated with the memory plane in which the magnetic cores 100 are to be used. Although the test evaluates "1" and "*d*0" responses, the circuit can also be adjusted to evaluate "*d*1" and "0" response signals.

To perform this sequence of tests evaluating the "1" and "*d*0" responses, the program generator 130 is adjusted to drive the core 100 under test so that a "1" is written in the first time slot, and "1" is read in the second time slot, a "0" is written in the third time slot, the "0" is disturbed in the fourth time slot, and the "*d*0" is read in the fifth time slot. To write a "1" in the first time slot, the top switch 1256 is closed so that the channel 1250 enables the write driver 928 in the first time slot of the repetitive time frame provided by the program generator 130. The write driver 928 is enabled with secondary timing by operating the switch 1258 to close the pair of contacts **1258*a* and connect the channel 1250 to the common secondary timing conductor 1151. The delay monostables 1114 and 1122 are adjusted to delay the secondary output signal on the conductor 1151 more than the delay of the primary signal on the conductor 1141, and the duration monostable 1118 in the secondary channel 1150 is adjusted to provide a duration for the secondary signal of around two microseconds. Thus, the write driver 928 will be enabled to apply a positive-going write pulse to the probe 914** of around five hundred milliamps for a duration of around two microseconds beginning at a point in the first time slot displaced from the beginning thereof.

To permit the "1" response of the core 100 under test to be evaluated in the second time slot, the second switch 1236 is closed to enable the channel 1230 in the second time slot. The control switch 1238 is operated to close the contacts **1238*b* so that the read channel 1230 is enabled with primary timing. The delay monostable 1122 in the primary channel 1140 delays the initiation of the primary signal a desired amount following the initiation of the time slot, which delay is less than that provided in the secondary channel 1150, and the duration monostable 1126 is set to provide a primary pulse width of a desired length, such as three microseconds. With these settings, the read channel 1230 enables the read driver 926 to provide a negative-going read signal of around five hundred milliamps to the probe 914** in the second time slot with primary timing.

As illustrated in FIG. 14 of the drawings, it is necessary to provide concurrent write and inhibit signals to the core 100 under test to write a "0." Accordingly, the third switch 1256 in the write channel 1250 is closed so that the write driver 928 is enabled with secondary timing in the third time slot of the program generator 130. To provide substantially concurrent inhibit drive in the third time slot, the switch 1242 in the inhibit channel 1220 is closed, and the control switch 1228 is operated to close the contacts **1228*b* so that the inhibit channel 1220 provides an enabling signal to the inhibit driver 924 in the third time slot having primary timing. When enabled, the inhibit driver provides a negative-going signal of around six hundred and fifty milliamps to the inhibit probe 912**.

In this manner, both the write driver 928 and the inhibit driver 924 are substantially concurrently energized to provide the signals schematically shown in FIG. 14 for writing a "0" in the core 100 under test. However, the positive-going signal applied to the probe 914 by the write driver 928 is provided with a secondary timing, as contrasted with the primary timing of the negative-going signal provided by the inhibit driver 924. This means that the inhibit driver is enabled prior to the write driver 928. Further, the duration of the signal provided by the write driver 928 is less than the duration of the signal provided by the inhibit driver 924. This means that the core 100 under test sequentially receives a negative-going signal from the inhibit driver, a positive-going signal from the write driver, a negative-going signal at the termination of the write pulse, and a positive-going signal at the termination of the inhibit signal. This sequencing of the write and inhibit drives when the "0" is written prevents half switching of the core 100 under test and insures that the test core 100 is in the "0" magnetic state shown in FIG. 14.

Since the "*d*0" rather than the "0" response of the core 100 is to be evaluated, an inhibit drive is applied to the core 100 in the fourth time slot. To provide this drive, the fourth switch 1242 in the inhibit channel 1220 is closed. This controls the inhibit driver 924 to supply an inhibit current drive to the probe 912 during the fourth time slot.

The final step of the testing sequence is performed in the fifth time slot in which the "*d*0" response of the core 100 under test is evaluated. The fifth switch 1236 in the read channel 1230 is closed so that the read driver 926 is enabled in the fifth time slot with primary timing. Thus, by selectively closing the switches 1236, 1242, and 1256, the inhibit driver 924, the read driver 926, and the write driver 928 are enabled in the proper time slots so that a "1" is written in the first time slot, the "1" is evaluated in the second time slot, a "0" is written in the third time slot, the "0" is distributed in the fourth time slot, and the "*d*0" is evaluated in the fifth time slot.

The detectors 720, 730, 740, and 750 (FIG. 7) are also provided with a particular set of input reference potentials and strobing signals in dependence on the test or sequence of tests to be performed by the system 120. As set forth, the "0" or "*d*0" response signal is evaluated by the detectors 740 and 750, and in the selected representative test, the level of the "*d*0" response signal is checked to determine whether it exceeds the minimum level 2702 and does not exceed the maximum level 2704. To set the detector 750, the potentiometer 714 is connected to the reference potential input of the detector 750, is adjusted to a value representing the minimum value 2720 which must be exceeded by the "*d*0" potential to provide an indication that this signal is provided by the core 100 under test. The detector 740 is provided with a reference potential corresponding to the maximum value 2704 that cannot be exceeded by the "*d*0" signal by adjusting the potentiometer 712. With these reference potentials applied to the detectors 740 and 750, the detector 740 should not be set and the detector 750 should be set if the "*d*0" response of the core 100 during the test is proper.

In performing the "*d*0" evaluation, it is desirable to determine whether the "*d*0" potential represented by the waveform 2700 (FIG. 27) is present in the proper range of values at any time during the fifth time slot in which the "0" evaluation operation takes place. Accordingly, the switch 1024 is operated to a position selecting the fifth output conductor from the binary decoder 1218 on which a negative-going pulse appears for the full duration of the fifth time slot. This negative-going signal is coupled through the two inverters 1020 and 1022 and the normally closed contacts 973 to be applied to the enabling or strobe inputs of the two detectors 740 and 750. Thus, these two detectors are rendered effective to compare negative-going "*d*0" response signals supplied by the amplifier 706 against the reference potentials supplied by the potentiometers 712 and 714 during the fifth time slot in which the read driver 926 is enabled by the read channel 1230.

Referring now to the "1" evaluating detectors 720 and 730, the tests in the representative program for evaluating the "1" response consists of determining whether the amplitude of the "1" signal at a given point in the read operation performed in the second time slot has a value greater than the minimum acceptable value represented by the line 2708 (FIG. 27) and also of determining whether the switching time of the core under evaluation falls within predetermined limits. The switching time is checked by determining whether the "1" response potential which was above the set minimum value shown at line 2708 has fallen below a second set value represented by the line 2710 within a given time increment.

To prepare the detector 730 to act as a minimum level detector, the potentiometer 710 is set to a position supplying a negative potential to the reference potential input of the detector 730 corresponding to the minimum value represented by the line 2708 in FIG. 27. The potentiometer 708 is adjusted to a setting applying a negative reference potential to the input of the maximum level detector 720 corresponding to the maximum value represented by the line 2710 that the "1" response signal can have within a given time interval following the point at which it reaches its peak amplitude. Further, the switch 761 is operated to open the contacts **761*b* and to close the contacts 761*a* so that the set output of the detector 720 is connected to the AND gate diode 772**.

To permit the switching time of the core 100 under test to be evaluated, the strobe signal control means in the control circuit 128 is so adjusted that the detector 730 is enabled at a point generally corresponding to the point of peak amplitude of the "1" response signal represented by the curve 2706, and the detector 720 is enabled in the same time slot at a position spaced from the point at which the detector 730 is enabled by a period of time equal to the desired switching time of the core 100. In other words, the "1" response signal must fall from a value exceeding the level represented by the line 2710 in the interval separating the times at which the detectors 730 and 720 are sequentially strobed.

To condition the control circuit 128 to supply this type of strobe or gate signals, the switch means 960 is operated to close a plurality of contacts 961, 963, and 965 and to open the contacts 962 and 964. The opening of the contacts 962 and 964 disconnects the strobe inputs of the detectors 720 and 730 from the outputs of the wide strobe inverters 1000 and 1010. The closure of the contacts 963 connects the strobe input of the detector 720 to the pulse output of the monostable timing circuit 946, and the closure of the contacts 965 connects the strobe input of the detector 730 to the pulse output of the monostable circuit 956. The closure of the contacts 961 connects the output of the inverter 1000 over the contacts 971 and 978 to the inputs of the inverters 950 and 940 in the two delay channels. The input switch 1004 is operated to its second setting in which the negative-going pulse in the second time slot is applied to the input of the inverter 1002. This signal is coupled through the inverter 1000 to be applied to the inputs of the inverters 940 and 950. Thus, the two delay channels in the control circuit 128 are energized in the second time slot of the time frame. The delays of the circuits 952 and 956 are so adjusted that at the end of a time interval shown as T1 in FIG. 27, the pulse output of the delay circuit 956 provides a negative-going enabling pulse of 50–70 nanoseconds duration to the strobe input of the detector 730. For the seventy nanosecond interval in which the detector 730 is enabled, the amplitude of the "1" response signal indicated by the curve 2706 is compared with the reference potential corresponding to the minimum value represented by the line 2708. At the end of this seventy nanosecond pulse, the detector 730 is again disabled. The monostable timing circuits 942 and 946 are set to provide a greater delay so that at the end of a time interval shown as T2 in FIG. 27, the timing circuit 946 provides a negative-going enabling pulse of 50–70 nanoseconds duration to the strobe input of the detector 720. At this time, this detector responds to the amplitude of the potential provided by the amplifier 704 to determine whether the "1" response voltage has dropped below the reference level represented by the line 2710. If it has dropped below the level represented by the line 2710, the "1" switching time of the core 100 under test is satisfactory.

Accordingly, from considering the waveforms 2700 and 2706 shown in FIG. 27, the satisfactory completion of the "1" evaluation test is indicated by the setting of the detector 730 to represent the fact that the "1" response signal exceeds the minimum level represented by the line 2708, and the detector 720 is not set indicating that the "1" response voltage dropped below the level represented by the line 2710 within the required switching time and before the detector 720 is enabled. Similarly, the detector 740 is not set to indicate that the "0" response did not rise to the maximum limit represented by the line 2704, and the "0" evaluating detector 750 is set indicating the presence of a "*d*0" response signal of at least the minimum value represented by the line 2702.

When the system 120 is first conditioned for operation by energizing the electronic components thereof, the clock pulse source 1100 drives the binary counting chain 1200 through a cycle of operation during which no useful operations are performed. When the counter 1200 reaches its last setting in which a negative-going pulse is applied to the last output conductor representing the eighth time slot, an inverter 1280 is placed in conduction to apply an inhibiting potential to one diode 1054 in an AND gate including a second diode 1052. This diode is connected to the primary conductor 1141 to receive an inhibiting signal during the primary signal supplied by the channel 1140. At this time, an inverter 1056 is placed in a nonconductive condition so that a negative potential is supplied to the input of an inverter 1058. The inverter 1058 forwards a positive potential to a generator control flip-flop 1048 so that this inverter is set to apply a negative potential to the input of a lamp amplifier 1046. The amplifier 1046 illuminates a lamp 1044 to provide a visible indication that the counting chain 1200 has reached the end of one cycle of operation in which the eight time slot signals are generated. The negative potential provided by the flip-flop 1048 is also applied to the input of an inverter 1108 which provides a ground clamp on the output of the inverter 1106 driven from the clock pulse source 1100. Accordingly, for so long as the inverter 1108 is retained in a conductive state, the pulse source 1100 is ineffective to drive the counter 1200, and this counter remains in the eighth time slot setting.

The negative potential at the output of the inverter 1056 also places an inverter 1066 in conduction so that a more positive signal is applied to the cathode of a diode 1062 forming one input to an AND gate including a second diode 1060 and an inverter 1064. The cathode of the diode 1060 is returned to a more negative potential at the output of a normally nonconductive inverter 814 so that this AND gate is not fully enabled.

When the system 120 is used with the automatic core handling apparatus 122, the drive means therefor is placed in operation so that the cores 100 to be tested are separated from a bulk supply and supplied to the recesses 902 on the turntable 900. This table is rotated to advance the first core 100 to be tested to the testing station 906. When the core 100 reaches this position, a support for the probes 912, 914, and 916 is actuated to insert these probes through the openings 102, 104, and 106 in the core 100 into the sockets or receptacles 918, 920, and 922. The core 100 to be tested is now coupled with the inhibit driver 924, the read driver 926, the write driver 928, and the input of an amplifier 700. As the probes 912, 914, and 916 are inserted, the switching assembly 932 is actuated to apply a negative potential to one diode 846 of an AND gate including a second diode 848. This places the inverter 850 in a conductive condition so that a positive signal is applied to the input of an inverter 852 to place this inverter in a nonconductive condition. The negative signal provided by the switch assembly 932 is also applied to the input of an inverter 854 to place this inverter in conduction so that a more positive signal is applied to the input of an inverter 856. This places the inverter 856 in a nonconductive condition but does not set a monostable circuit 858 connected to the inverter 856.

The automatic core handling apparatus 122 includes an additional set of switches 802 and 804 which are responsive to movement of the assembly including the probes 912, 914, and 916. When these probes are inserted through the openings 102, 104, and 106 into the receptacles 918, 920, and 922 ,the switch 802 is operated to momentarily close two pairs of normally open contacts 802*a* and 802*b*. When the probes 912, 914, and 916 are retracted, the switch 804 is operated to momentarily close two pairs of normally open contacts 804*a* and 804*b*. Thus, when the probes 912, 914, and 916 are inserted into the core 100 at the testing station 906 in the manner described above, the contacts 802*a* and 802*b* are momentarily closed. The closed contacts 802*b* control a pulse generator 826 to supply a negative-going pulse through the closed contacts 802*a* to a diode 828 forming one input of an OR gate including a second input diode 830. This negative pulse provided by the pulse generator 826 is forwarded through the diode 828 to place an inverter 859 in conduction. The positive pulse provided by the inverter 859 is coupled through a pair of series connected inverters 862 and 864 to set a monostable cycle delay circuit 866. The delay provided by this circuit 866 is such as to permit the complete resetting of the components in the apparatus 120 following the completion of a prior testing operation.

At the end of the delay output, the monostable circuit 866 supplies a negative-going pulse to the input of an inverter 1050 which applies a positive-going pulse to reset the flip-flop 1048. The reset flip-flop 1048 applies ground potential to the input of the lamp inverter 1046 to terminate the energization of the lamp 1044 and provide a visible indication that a cycle of operation of the program generator 130 has been initiated. The more positive signal from the reset flip-flop 1048 is also applied to the input of the inverter 1108 to place this inverter in a nonconductive condition. This removes the ground clamp from the output of the inverter 1106 and permits the counting circuit 1200 to be driven through a cycle of operation in which the eight discrete time slot signals in repetitive time frame are generated.

When a negative-going pulse is applied to the first output conductor from the binary decoder 1218 defining the first time slot, it is effective to control the write channel 1250 to supply a negative-going enabling pulse with secondary timing to the write driver 928 in the manner described above so that a write current pulse is applied to the center probe 914. This writes or stores a "1" in the core 100 and provides the remanent magnetic states in the core 100 illustrated in FIG. 15. No other operations are performed in the first time slot.

When the binary decoder 1218 is operated by the counting circuit 1200 to supply a negative-going pulse to the second output conductor in the second time slot, the read channel 1230 is controlled to supply a negative-going enabling signal with primary timing to the input of the read driver 926 so that a negative-going read signal is applied to the center probe 914. This read signal switches the core 100 under test to the magnetic state shown schematically in FIG. 18 of the drawings. Thus, the magnetic flux in the core leg 114 is switched from the direction shown in FIG. 15 in which a "1" is stored in the core 100 to the state shown in FIG. 18. This induces a "1" response signal in the probe 916 which is coupled over the cable 930, the amplifier 700, and the attenuating network 702 to the inputs of the amplifiers 704 and 706. However, only the output from the amplifier 704 is effective because the "0" evaluating detectors 740 and 750 are not enabled.

To permit the "1" response signal to be evaluated in the second time slot, the negative-going second time slot signal is forwarded over the switch 1004, the inverters 1002 and 1000, the closed contacts 978 and 961 to be applied to the inputs to the two delay channels in the control circuit 128. The pulse at the end of the delay period shown as T1 in FIG. 27 in the monostable circuit 956 provides a negative-going pip or pulse of 50–70 nanoseconds which is forwarded through the closed contacts 965 to be applied to the strobe input of the detector 730. If the "1" response signal has an amplitude exceeding the level indicated at line 2708 in FIG. 27, the storage flip-flop in the slicer detector 730 is set so that a negative potential is applied to the input of the lamp amplifier 732 to illuminate the lamp 734. The illumination of the lamp provides an indication that the "1" response signal has a peak amplitude in the strobe interval at least as great as the minimum requirement represented by the line 2708 in FIG. 27. The setting of the storage flip-flop in the detector 730 also applies ground potential through the closed contacts 763*a* to the cathode of the diode 771 to provide one enabling potential to this AND gate indicating the satisfactory conclusion of the test for maximum amplitude of the "1" response signal.

After an additional time delay or following the period T2 (FIG. 27), the monostable time circuit 946 provides a 50–70 nanosecond pulse which is forwarded through the closed contacts 963 to the strobe input of the detector 720. This detector now checks the level of the "1" response signal in a portion of the characteristic curve 2706 spaced from the point at which the minimum amplitude was previously determined. If the amplitude of the "1" response signal has fallen below the predetermined level represented by the line 2710 in FIG. 27, the "1" switching time of the core 100 is satisfactory, and the storage flip-flop in the detector 720 is not set. Alternatively, if the switching time is unsatisfactory, the amplitude of the "1" response is above the level represented by the line 2710 and the detector 720 is set. When this detector is set, the lamp amplifier 722 energizes the lamp 724 to provide an indication of the unsatisfactory results of the test made by the detector 720. Further, a negative potential is applied to the cathode of the diode 772 to apply an inhibit to the "1" evaluating AND gate.

Assuming that the magnitude of the "1" response signal is below the level represented by the line 2710 so that the detector 720 is not set, the lamp 724 is not energized, and a potential approaching ground is applied to the cathode of the diode 772. The cathode of the diode 771 is returned to substantially ground potential by the setting of the detector 730. Thus, the "1" evaluating AND gate including these two diodes is completely enabled, and the inverter 770 returns to a nonconductive condition so that a more negative potential is applied to the input of an inverted 814 forming one half of a NAND gate for indicating the satisfactory completion of both the "1" tests and the "*d*0" tests. The inverter 816 which forms the other half of the NAND gate is held in a nonconductive condition at this time by the "0" evaluating AND gate including the inverter 780. The negative potential provided at the output of the inverter 770 is also applied to the input of an inverter 818 which is placed in conduction to terminate the illumination of a lamp 836 by a lamp amplifier 832. The lamp 836 is normally energized, and its present darkened condition signifies the satisfactory completion of the "1" evaluating tests.

Returning to the operation of the program generator 130, the core 100 is now in the normal or read state shown in FIG. 18. When the third time slot signal is generated by the binary decoder 1218, the inhibit channel 1220 provides a negative-going pulse in the third time slot with primary timing for enabling the inhibit driver 924 to supply a negative-going pulse to the probe 912. After a short delay, the write channel 1250 enables the write driver 928 so that a positive-going write signal is applied to the center probe 914. The write driver 928 is disabled followed by the disabling of the inhibit driver 924. Thus, the inhibit pulse and the write pulse are superimposed on the core 100 under test to switch this core to the flux state shown schematically in FIG. 14 representing a "0."

When the fourth time slot is developed under the control of the counting circuit 1200, the inhibit channel 1220 again provides an inhibit pulse with primary timing for enabling the inhibit driver 924 so that the end probe 912 is again energized with a negative-going signal. This switches the core 100 under test from the "0" state shown in FIG. 14 to the identical "*d*0" state shown in FIG. 17 so that the test apparatus 120 can evaluate the "*d*0" response of the core 100 under test.

The program generator 130 then supplies the fifth time slot pulse which is used by the read channel 1230 to enable the read driver 926 with primary timing so that a negative-going pulse is applied to the center probe 914. This negative-going pulse switches the core 100 from the state shown in FIG. 17 to the normal or read state shown in FIG. 18. Although the flux in the sense leg 114 of the core 100 is not reversed, an output signal of relatively small amplitude is developed in the sense probe 916 which is forwarded over the cable 930, the amplifier 700, and the attenuation network 702 to be applied to the inputs of both of the amplifiers 704 and 706. The "0" evaluating detectors 740 and 750 are enabled in this fifth time slot to determine whether the disturbed "0" or "*d*0" response signal is present and has less than a given maximum amplitude. As set forth above, this is established by insuring that the "*d*0" response signal shown by the waveform 2700 in FIG. 27 has an amplitude that is greater than that indicated by the line 2702 to which the detector 750 is set and less than the level represented by the line 2704 to which the detector 740 is set. Thus, a satisfactory conclusion of the "0" evaluating tests requires the detector 750 to be set and the detector 740 to remain reset.

The detectors 740 and 750 are strobed to evaluate the "0" response signal from the amplifier 706 by the negative-going signal occurring in the fifth time slot which is coupled through the switch 1024, the inverters 1020 and 1022, and the closed contacts 973 to be applied concurrently to the strobe inputs of both of the detectors 740 and 750. If the amplitude of the "0" response signal shown by the waveform 2700 (FIG. 27) is greater than the reference potential represented by the line 2702, the detector 750 is set. Further, if the maximum amplitude reached during the entire fifth time slot does not reach the level of the reference potential supplied to the detector 740, which is represented by the line 2704 in FIG. 27, the detector 740 is not set. The setting of the detector 750 energizes a lamp amplifier 752 so that the lamp 754 is illuminated. Further, the setting of the detector 750 supplies an enabling potential through the closed contacts 765*a* to the cathode of the diode 781 in the "0" evaluating AND gate. The fact that the detector 740 is not set means that the lamp 754 is not illuminated and a more positive enabling potential is present at the cathode of the diode 782.

Thus, when the detector 750 is set and the detector 740 is not set, all of the inputs to the "0" evaluating AND gate are enabled, and the inverter 780 is placed in a nonconductive condition. This applies a more negative potential to the input of an inverter 824 so that a lamp amplifier 834 is disabled and the illumination of a lamp 838 is terminated. The termination of the illumination of the lamp 838 provides a visible indication that the "0" evaluation of the core 100 under test has been satisfactorily completed. The negative potential provided at the output of the inverter 780 is also forwarded to the input of the inverter 816 so that this inverter is placed in a conductive condition. Thus, the NAND gate including the inverters 814 and 816 is now completely enabled, and a more positive potential is provided at the output of the inverter 814 representing the satisfactory completion of all of the tests. During the remaining sixth, seventh, and eighth time slots, no operations are performed by the system 120, and the eighth time slot signal and the primary signal again complete the enabling of the AND gate including the diodes 1052 and 1054 so that the inverter 1058 sets the flip-flop 1048 to energize the inverter 1108 so that further operation of the counting circuit 1200 is inhibited. The inverter 1056 also places the inverter 1066 in a conductive condition so that one input to the AND gate connected to the inverter 1064 is enabled.

The more positive or ground potential provided at the output of the inverter 814 in the NAND gate is forwarded to the cathode of the other diode 1060 in the AND gate for the inverter 1064 so that this inverter is placed in a nonconductive condition to apply a more negative potential to the input of an inverter 872. This places the inverter 872 in a conductive condition so that a first storage flip-flop 860 is set. When this flip-flop is set, a lamp amplifier 868 energizes a lamp 870 to provide a visible indication that the satisfactory completion of the "1" and "0" evaluating tests has been stored in the flip-flop 860. Further, when the flip-flop 860 is set, a more positive or ground potential is applied to the cathode of a diode 848 in the AND gate for the input of the inverter 850. The other input to this gate provided by the diode 846 is inhibited because of the negative potential suppiled by the switch unit 932 representing the fact that the probes 912, 914, and 916 are still inserted in the openings in the core 100 under test.

The system 120 remains in this condition until the probes 912, 914, and 916 are withdrawn from the openings 102, 104, and 106 in the magnetic core 100 under test. At this time, the switching unit 932 applies a ground enabling potential to the cathode of the diode 846 in the AND gate connected to the input of the inverter 850. The other diode 848 in this AND gate is either inhibited or enabled in dependence on the setting of the flip-flop 860. Assuming that one of the tests on the core 100 in the test position did not yield satisfactory results, the core 100 must be rejected, and the flip-flop 860 has not been set. Thus, a negative inhibiting potential remains supplied to the diode 848, and the withdrawal of the probes 912, 914, and 916 does not change the conductive state of the inverter 850. However, when the probes are withdrawn from the core 100 under test, the switch 804 is operated to momentarily close the contacts 804_a_ and 804_b_. The closure of the contacts 804_a_ controls the pulse generator 826 to supply a negative-going pulse through the closed contacts 804_b_ to the input of an inverter 820. This places the inverter 820 in conduction so that a delay circuit 822 is set. The delay of the circuit 822 is set to correspond to the time required to physically transport the the unsatisfactory core 100 from the testing station 906 to the reject station 908.

At that time, the delay circuit 822 supplies a negative-going pulse to the input of an inverter 1036 to place this inverter in a conductive state. This supplies a positive-going pulse to the input of a delay circuit 1038 which is set so that a negative potential is applied to the input of one inverter 1042 in a NAND gate. This NAND gate includes a second inverter 1040 whose input is connected to a negative potential at a second storage flip-flop 840. Thus, both of the inverters 1040 and 1042 are placed in conduction to provide a more positive potential to the input of an amplifier 1030. The amplifier 1030 is connected to the solenoid 936 at the reject station 908 and is controlled by the amplifier 1030 to eject the defective core 100 through the discharge chute 934. Thus, the defective core has been ejected from the table 900 prior to being advanced to the accept station 910. At the end of its delay interval, the circuit 1038 restores to its normal condition so that the inverter 1042 in the NAND gate is inhibited. This returns the solenoid 936 and the amplifier 1030 to their normal states.

Assuming, however, that the "0" and "1" evaluating tests on the core 100 under test are all satisfactorily completed prior to the time at which the probes 912, 914, and 916 are withdrawn to control the switch 932 to supply an enabling potential to the diode 846, the flip-flop 860 is set representing the satisfactory completion of the test, and the diode 848 is enabled. This places the inverter 850 in a nonconductive condition so that a more negative potential is applied to the input of an inverter 852. This places the inverter 852 in conduction to set the second storage flip-flop 840. When the second storage flip-flop 840 is set representing the satisfactory completion of the prior test on the magnetic core 100 at the testing station 906, a lamp amplifier 842 energizes a lamp 844 to provide a visible indication of the fact that the test on the preceding core 100 has been satisfactorily completed and that this result has been shifted from the first storage flip-flop 860 to the second storage flip-flop 840. The setting of the flip-flop 840 also applies a positive potential to the input of an amplifier 1032 to operate a counter 1034 to indicate the fact that a core has been satisfactorily tested.

This positive potential provided at the output of the set flip-flop 840 is also applied to the input of the inverter 1040 to inhibit the NAND gate so that the solenoid 936 cannot be operated to reject a satisfactory core at the rejection station 908. Accordingly, when the withdrawal of the probes 912, 914, and 916 from the core 100 under test actuates the switch 804 to momentarily close the contacts 804_a_ and 804_b_, the negative pulse forwarded through the closed contacts 804_b_ places the inverter 820 in conduction to pulse the delay circuit 822 so that a negative-going pulse is provided at the end of the delay period of this circuit. This places the inverter 1036 in conduction as described above to set the monostable circuit 1038. The negative potential applied to the input of the inverter 1042 is not effective to control the operation of the solenoid 936 because of the inhibiting potential applied to the input of the other inverter 1040 in the NAND gate.

However, at the end of the delay period of the circuit 1038, a positive-going pulse is transmitted from this circuit to the reset input of the flip-flop 840 to restore this flip-flop to its normal condition. This terminates the energization of the lamp amplifier 842 so that the lamp 844 is extinguished to indicate that the second storage unit has been cleared. Further, when the flip-flop 840 is reset, the inhibiting potential is removed from the inverter 1040 in the reject NAND gate, and the amplifier 1032 is restored to its normal condition.

Referring back to the operation of the switching assembly 932 when the probes 912, 914, and 916 are removed from the tested core 100, the ground applied to the cathode of the diode 846 is also applied to the input of the inverter 854. This places the inverter in a nonconductive state so that the inverter 856 is placed in a conductive state. This applies a positive-going pulse at the input of the delay circuit 858. After a delay interval long enough to insure that the second storage flip-flop 840 is set in the manner described above, the delay circuit 858 is restored to a normal condition and, in doing so, forwards a positive-going pulse to the reset input of the first storage flip-flop 860. When the flip-flop 860 is reset, the energizing potential is removed from the input of the lamp amplifier 868 so that the lamp 870 is no longer illuminated. Further, the resetting of the flip-flop 860 removes the enabling potential from the gate 848 so that this gate is inhibited, and the inverter 850 is maintained in a conductive condition. This completes the resetting of the test circuit 120.

This circuit remains in this condition until the probes 912, 914, and 916 are next inserted through the openings in the next core 100 to be tested. At this time, the switch 802 is again operated to momentarily close the contacts 802_a_ and 802_b_. In response to the closure of the contacts 802_b_, the pulse source 826 again forwards a negative-going pulse through the closed contacts 802_a_ to the diode 828 in the OR gate connected to the input of the inverter 859. This places the inverter in conduction so that the inverters 862 and 864 again set the delay circuit 866. Further, the inverter 859 forwards a positive-going pulse to the reset terminals of the four detectors 720, 730, 740, and 750 so that all of these detectors are reset to a normal condition. When all of the plurality of detectors 126 are reset, the illumination of the four lamps 724, 734, 744, and 754 is terminated. Further, the "1" evaluating AND gate including the inverter 770 and the "0" evaluating AND gate including the inverter 780 are restored to inhibited conditions in which the inverters 770 and 780 are placed in a conductive condition. This disables the NAND gate including the inverters 814 and 816 to place an inhibiting potential on the diode 1060 so that this inverter returns to a conductive condition and places the inverter 872 in a nonconductive condition. Placing the inverters 770 and 780 in a conductive condition also restores the inverters 818 and 824 to a nonconductive condition so that the lamp amplifiers 832 and 834 again illuminate the "1" lamp 836 and the "0" lamp 838. Thus, the system 120 is now in condition for the performance of a second cycle of testing operation. This conditioning and the performance of the following tests on the new core 100 at the station 906 can take place concurrently with and independently of the sorting of the previously tested core 100 which is controlled by the second storage flip-flop 840.

After a delay sufficient to insure the completion of the resetting operations described above, the monostable circuit 866 again supplies a negative-going pulse to the input of the inverter 1050 which resets the program generator control flip-flop 1048. When the flip-flop 1048 is reset, the illumination of the lamp 1044 is terminated, and the inhibiting or clamping inverter 1108 is rendered ineffective so that the inverter 1106 is again rendered effective to operate the counting circuit 1200 through a cycle of operation. During this cycle of operation, the core 100 now at the testing station 906 is subjected to the same sequence of tests described above. During the next indexing movement of the table 900, the second core 100 tested is advanced to the reject station 908 and is either ejected into the chute 934 or retained in the recess 902 in dependence on the results of the tests performed thereon. A third core 100 is advanced to the station 906, and the first tested core 100 is advanced to the accept station 910 in which it is automatically removed. This testing continues for so long as the system 120 is maintained in an operative condition and the automatic core handling apparatus 122 is operated.

As set forth above, the four lamps 724, 734, 744, and 754 are selectively illuminated in accordance with the settings to which the detectors 720, 730, 740, and 750 are operated during the testing operation and provides means for visibly indicating either satisfactory completion of the test or the unsatisfactory conclusion of the testing operations. Various combinations of lamp on and off conditions are set forth in the following table together with an indication of the test results represented thereby.

| Lamp 724 | Lamp 734 | Lamp 744 | Lamp 754 | Remarks |
|---|---|---|---|---|
| On | On | Off | On | Switching time of "1" too long. |
| Off | Off | Off | On | Low "1". |
| Off | On | On | On | High "d0". |
| Off | On | Off | Off | Low "d0". |
| Off | Off | Off | Off | Low "d0", low "1" or no signal. |
| Off | On | Off | On | Signals correct. |

The testing system 120 can also be used with a fixture in which each core 100 to be tested is manually placed in a jig or fixture and probes similar to the probes 912, 914, and 916 are inserted through the openings 102, 104, and 106 in the test core 100 to be received in receptacles similar to the receptacles 918, 920, and 922. When the manual fixtures is used, the storage flip-flops 840 and 860 and the circuitry associated therewith is not used. The remainder of the system 120 is then conditioned for performing the desired tests, such as the particular "1" and "0" evaluating tests described above.

The operation of the system 120 when used with a manual fixture is initiated by operating a single test switch or push button 812 to momentarily close a plurality of contacts **812*a* and 812*b*. The closure of the contacts 812*b* controls the pulse generator 826 to provide a negative-going pulse that is forwarded through the closed contacts 812*a* to the diode 828. This causes a cycle of testing operation to be performed in the manner described above. If neither of the lamps 836 and 838 are illuminated at the conclusion of the test operation, the core in the manual fixture meets the test requirements and can be manually placed in an accept receptacle. On the other hand, if either one of the lamps 836 or 838 remains illuminated, either the "1" or "0" evalutions, respectively, has failed, and the core is manually placed in the reject receptacle. Each time that the switch 812 is actuated to start a new additional cycle of operation, the positive-going pulse at the output of the inverter 860 resets the detectors 720, 730, 740, and 750 in the manner described above and also resets the portion of the system 120** that is used in the manual operation.

When the system 120 is operated with a manual fixture, it is also desirable, in some instances, to be able to determine the exact values of the "1" and "0" response signals, rather than only the fact that they are above or below given levels. To provide this exact evaluation, the system 120 is controlled to automatically repeat a given test an indefinite number of times by closing a switch 874. This switch connects a second diode 830 in the NOR gate to the output of the inverter 1064. Thus, each time that a testing cycle has been successfully completed, the detectors 720, 730, 740, and 750 are automatically reset and the delay circuit 866 is set to cause the program generator 130 to perform an additional cycle of operation during which the same test is repeated as soon as the delay interval of the circuit 866 has expired. If the test is not satisfactorily completed, the inverter 1064 remains in a conductive condition, the detcetors 720, 730, 740, and 750 are not cleared, an additional cycle of operation is not automatically reinitiated, and the operator is able, by the use of the table set forth above, to determine a possible cause for the failure of the core 100 under test. Since the tests are continuously repeated for so long as satisfactory test results are obtained, the test operator can manually adjust any given one of the potentiometers 708, 710, 712, and 714 to change the reference level potential supplied to the four detectors 720, 730, 740, and 750 until such time as the related test fails. At that time, the setting of the adjusted one of the potentiometers indicates the actual value of the "1" or "0" response signal.

As an example, if it becomes desirable to determine the actual peak amplitude of the "1" response signal shown by the waveform 2706 (FIG. 27), the potentiometer 710 can be adjusted to increase the magnitude of the negative potential supplied to the reference potential input of the detector 730 during the time in which repeated checking operations are being performed. When the magnitude of the potential represented by the line 2708 (FIG. 27) becomes slightly greater than the peak amplitude of the "1" response, the detector 730 is no longer set, and the lamp 734 will no longer be illuminated. By determining the setting of the potentiometer 710 at the point at which the light 734 no longer is illuminated, the actual value of the "1" response signal during the strobe period in which the detector 730 is enabled can be determined. Repeated operations of the system 120 can be reinitiated by again depressing or actuating the switch 812. Further, the minimum or peak value of either of the "0" or "1" response signals can be precisely determined during repeated operations by adjusting the potentiometers 708, 712, and 714 in a manner similar to that described above. When the contacts 874 are opened, the system 120 returns to its automatic mode of operation used in conjunction with the automatic core handling apparatus 122.

The system 120 also includes a manually actuated key or switch 810 having a plurality of contacts **810*a* and 810*b* which are closed when the switch is actuated. The contacts 810*a* and 810*b* perform the same functions as the automaically operated contacts 804*a* and 804*b* on the switch 804 which is operated when the probes are withdrawn. The switch 810 provides means for checking the automatic data transfer handling functions of the system 120** without requiring a complete cycle of operation of the system.

Figure 24:
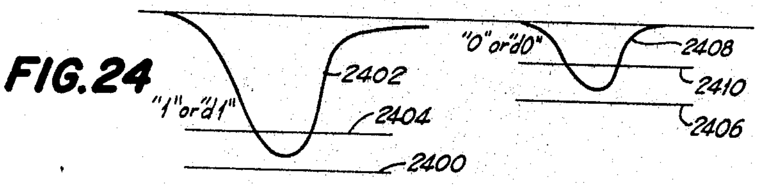
Figure 25:
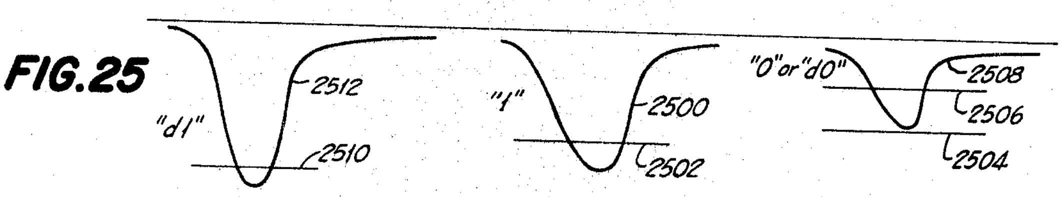

As set forth above, the system 120 is capable of performing a large number of different tests or sequences of tests on the magnetic cores 100. FIGS. 24–26 schematically illustrate a number of additional tests that can be performed on the cores 100 with the system 120. In all of these tests, the inhibit channel 1220, the read channel 1230, and the write channel 1250 are selectively controlled to provide a proper sequence of pulses for the inhibit driver 924, the read driver 926, and the write driver 928, respectively, so that the core 100 is operated to the desired ones of the magnetic states shown in FIGS. 14–18 in the sequence necessary for performing the tests. This selective setting of the time slots of these channels and the selective interconnection of the primary and secondary conductors 1141 and 1151 to these channels can be performed in generally the same manner described above.

One of these additional tests is illustrated in FIG. 24 in which a "1" or "*d*1" signal is checked to establish that its peak value exceeds a given level and is less than a greater level, and a "0" or "*d*0" response signal is checked to determine whether it exceeds a given minimum level and is less than a greater maximum level. To adjust the "1" detectors 720 and 730 for performing the test, the potentiometer 708 is adjusted to supply a reference negative potential represented by the line 2400 in FIG. 24 to the reference potential input of the detector 720 representing a maximum value which the "1" or "*d*1" response signal represented by a waveform 2402 must not exceed. The poteniometer 710 is adjusted to supply a reference potential input to the detector 730 corresponding to a minimum value represented by a line 2404 that should be exceeded by the "1" or "*d*1" response signal represented by the waveform 2402. To set the "0" evaluating detectors 740 and 750, the potentiometer 712 is adjusted to supply a reference level potential to the detector 740 represented by a line 2406 corresponding to the maximum acceptable value of the "0" response signal represented by a waveform 2408. The potentiometer 714 provides a negative reference potential to the input of the detector 750 indicated by a line 2410. This potential represents the minimum acceptable level that must be exceeded by the "0" or "*d*0" response signal.

In this test, the four detectors 720, 730, 740, and 750 are to remain responsive to the signals received from the sense probe 916 throughout the time slot in which the "0," "*d*0," "1," or "*d*1" response signal is being evaluated. If it is assumed that a "1" is written in the first time slot and is to be evaluated in the second time slot, the switches 1004 and 1014 are set in positions connecting the second time slot signals to the inverters 1002 and 1012. Since the switches 960 and 970 are both in a released condition, the inverters 1000 and 1010 are connected to the strobe inputs of the detectors 720 and 730, respectively. Thus, these two detectors are enabled throughout the second time slot to determine whether the peak amplitude of the "1" response signal represented by the waveform 2402 falls between the levels represented by the lines 2400 and 2404. Since a proper test result requires the setting of the detector 730 with the detector 720 remaining in the reset condition, the switch 761 is again operated to close the contacts **761*a* and to open the contacts 761*b*. This properly interconnects the detectors 720 and 730 with the "1" evaluating AND gate including the diodes 771 and 772 and the inverter 770**.

Assuming that a "0" is written in the third time slot and is evaluated or read in the fourth time slot, the switch 1024 is operated to connect the fourth time slot conductor to the input of the inverter 1022. The output of the second inverter 1020 is connected to the strobe inputs of the detectors 740 and 750 through the normally closed contacts 973. Accordingly, these two detectors are enabled in the fourth time slot for substantially the entire duration thereof to determine whether the "0" response signal represented by the waveform 2408 is greater than the level represented by the line 2410 and is less than the level represented by the line 2406. As in the test described in detail above, the correct conclusion of this test requires the detector 740 to remain in the reset condition and the detector 750 to be set. Accordingly, the connections between the detectors 740 and 750 and the "0" evaluating AND gate including the diodes 781 and 782 and the inverter 780 are correct.

When the "*d*1" and "*d*0" response signals are to be evaluated, an additional time slot is required for the drive pulse to disturb the "1" or the "0" stored in the test core. This means that the read operations must be set back a corresponding number of time slots in the testing time frame.

Substantially the same characteristics of the "1" or "*d*1" and "0" or "*d*0" response signals of the core 100 determined by the preceding test can be evaluated in selected portions only of the two read time slots by operating the system 120 in a different mode. In the preceding mode illustrated in FIG. 24, the "1" or "*d*1" and the "0" or "*d*0" response signals shown by the waveforms 2402 and 2408 are evaluated for maximum and minimum values over a period extending substantially the full time width of the second and fourth time slots in which it was assumed that the reading operations were performed. These same characteristics can also be evaluated by the system 120 in the manner shown schematically in FIG. 26 in which the maximum and minimum values are evaluated during only a selected portion of each of the two time slots in which the read operations are performed.

More specifically, the "1" or "*d*1" response signal represented by a waveform 2600 is compared against a minimum acceptable value represented by a line 2602 corresponding to the reference potential supplied to the detector 730 by the potentiometer 710 and a maximum value represented by a line 2604 corresponding to a negative reference potential supplied to the detector 720 by the potentiometer 708. Similarly, a "0" or "*d*0" response signal 2606 is compared against a minimum value represented by a line 2608 corresponding to the negative reference potential supplied to the input of the detector 750 by the potentiometar 714. The maximum value against which the "0" or "*d*0" response signal 2606 is compared is represented by a line 2610 corresponding to the negative reference potential supplied to the input of the detector 740 by the potentiometer 712. However, to enable the detectors 720, 730, 740, and 750 during only selected portions of the time slots in which the "1" or "*d*1" and "0" or "*d*0" responses are evaluated, the switch 970 is actuated and an additional switch 980 is closed. In addition, the switches 948 and 958 in the delay channels are operated to close the contacts **948*a* and 958*a* to select the pulse outputs from the output delay circuits 946 and 956**.

If it is assumed that the "1" characteristic represented by the waveform 2600 is to again be evaluated in the second time slot, the switch 1004 is set to connect the input of the inverter 1002 to the second conductor on which the negative-going second time slot signal appears. The output of the inverter 1000 is connected through the closed switch 980 to the input of the inverter 940 in one of the delay channels. The time constants of the two delay circuits 942 and 956 are adjusted to provide a delay indicated as T1 in FIG. 26. Thus, at the end of this delay period in the second time slot, a negative-going pulse is forwarded through the closed contacts **948*a*, 976, and 964 to the strobe input of the detector 730. This same signal is forwarded through the closed contacts 948*a*, 977, and 962 to the strobe input of the detector 720. Thus, the two detectors 720 and 730** for evaluating the "1" or "*d*1" characteristic are enabled for only the 50–70 nanosecond interval in the second time slot following the delay shown as T1 in FIG. 26.

Assuming that the "0" evaluating detectors 740 and 750 are to be enabled in the fourth time slot, the switch 1024 is operated to a position selecting the fourth time slot conductor so that the negative-going pulse appearing thereon is forwarded through the closed contacts 972 to the input of the inverter 950 in the second delay channel in the control circuit 120. The time constant controlling components of the monostable circuits 952 and 956 are set to provide the time delay shown as T2 in FIG. 26 so that at the end of this time interval, a negative-going pulse is forwarded through the closed contacts **958*a* and 974 to the strobe inputs of the detectors 740 and 750**. Thus, these two detectors are enabled to perform the same test described above during only the 50–70 nanosecond interval that is delayed a time T2 from the beginning of the fourth time slot.

The system 120 can also be operated to separately evaluate the "1" and "*d*1" response signal potentials for a predetermined minimum amplitude in conjunction with testing a "0" or "*d*0" potential for a peak value falling between predetermined maximum and minimum limits. In this test, a "1" can be written in the first time slot and read in the second time slot under the control of the write channel 1250 and the read channel 1230 in the manner described above. Further, a "0" can be written in the third time slot and read or evaluated in the fourth time slot under the control of the inhibit channel 1220, the write channel 1250, and the read channel 1230 in the manner described above. However, to provide the additional separate evaluation of the "*d*1" response, it is necesssary to actuate additonal ones of the switches 1236, 1242, and 1256 so that a "1" is written in the fifth time slot by the write driver 928, is disturbed in the sixth time slot by the inhibit driver 924 to provide the magnetic state for the core 100 under test shown in FIG. 16, and to read the "*d*1" response in the seventh time slot by enabling the read driver 926.

To prepare the plurality of detectors 720, 730, 740, and 750 for this mode of operation, the potentiometer 710 is adjusted to a setting providing a minimum negative reference potential to the reference potential input of the detector 730 in the same manner described above in the modes of operation illustrated schematically in FIGS. 24 and 26 of the drawings. In FIG. 25 of the drawings, the minimum reference potential against which the "1" response signal shown by a waveform 2500 is compared is represented by a line 2502. Similarly, the potentiometers 712 and 714 are adjusted to provide negative reference potentials represented by the pair of lines 2504 and 2506. The lines 2504 and 2506 establish maximum and minimum limits against which the "0" or "*d*0" response represented by a waveform 2508 is compared.

However, with respect to the detector 720, the potentiometer 708 is adjusted to provide a negative reference potential indicated by a line 2510 against which the somewhat larger amplitude of the "*d*1" response signal represented by a waveform 2512 is compared. Thus, the detector 720, instead of providing a maximum level detector, as in the operations illustrated in FIGS. 24 and 26, becomes a minimum level detector. This means that the detector 720 must be set rather than remaining in a reset condition during the test operation to indicate a satisfactory completion of the test. This requires that the connection to the diode 772 in the "1" evaluating AND gate be changed from the set output to the reset output. Accordingly, the switch 761 is operated to a condition in which the contacts **761*a* are opened and the contacts 761*b* are closed. This connects the cathode of the diode 772 to the reset output of the detector 720 over a circuit including the closed contacts 762*a* and 761*b*. Accordingly, when the detector 720** is set indicating that the "*d*1" response represented by the waveform 2512 has exceeded the minimum level represented by the line 2510, the corresponding input of the "1" evaluating AND gate is enabled. Further, since the detector 720 is to be set when the "1" response signal exceeds the minimum amplitude level, the lamp 724 should be illuminated at the completion of the test cycle.

In perforing the test shown schematically in FIG. 25, the detectors 720, 730, 740, and 750 are enabled for the full time slot in which the read operation is to take place, i.e., wide strobing. This means that the switch 970 remains in its normal condition. Since the "1" response is to be evaluated in the second time slot by the detector 730, the switch 1014 selects the second time slot conductor and a negative-going pulse is forwarded through the closed contacts 975 and 964 to the strobe input of the detector 730. Thus, the value of the "1" response signal represented by the waveform 2500 is compared against the minimum amplitude represented by the line 2502 throughout the entire second time slot.

The "0" response signal represented by the waveform 2508 is compared against the maximum and minimum limits represented by the lines 2504 and 2506 in the fourth time slot in the illustrative test. Thus, the switch 1024 is adjusted to select the fourth time slot conductor so that a negative-going pulse is aplied to the strobe inputs of the detectors 740 and 750 in the fourth time slot, this circuit extending from the output of the inverter 1020 through the normally closed contacts 973. The "*d*1" response signal represented by the waveform 2512 is compared against the minimum amplitude requirement represented by the line 2510 in the seventh time slot. Thus, the switch 1004 is operated to select the seventh time slot conductor so that a negative-going pulse from the output of the inverter 1000 is transmitted over a circuit including the closed contacts 978 and 962 to be applied to the strobe input of the detector 720 in the seventh time position. Accordingly, when the control circuit 120 is operated in this mode, the plurality of detectors 720, 730, 740, and 750 are enabled in three different time slots to permit a separate evaluation of the "1," the "*d*1," and the "0" or "*d*0" response signals.

The testing and evaluating system 120 can also perform a number of different and additional sequences of tests and evaluations on the cores 100 in dependence on the various time slots in which "0's," "*d*0's," "1's," and "*d*1's" are written in the cores, by applying different reference potentials to the detectors 126, and by enabling these detectors in different time slots or combinations slots. As an example, in the test shown schematically in FIG. 26, the "1" or "*d*1" and "0" or "*d*0" signal response potentials can be evaluated over a wider period of time than the 50–70 nanosecond intervals provided by the pulse outputs from the bistable circuits 946 and 956 by operating the switches 948 and 958 to close the contacts **948*b* and 958*b* rather than the contacts 948*a* and 958*a*. The time constants of the circuits 946 and 956** can be adjusted to provide a strobe pulse of any desired width within the limits for which these circuits are designed.

What is claimed and desired to be secured by Letters Patent of the United States is:

1. In an apparatus for testing a magnetic element having at least one opening; a write signal source coupled to the element; a read signal source coupled to the element; a signal detector coupled to the element; a program generator providing a plurality of discrete time spaced signals defining time slots in a repetitive time frame; adjustable means controlled by selected ones of the time spaced signals for rendering the write signal source, the read signal source, and the signal detector effective to supply signals to and receive signals from the magnetic element in a repetitive fixed sequence; and means for varying the position of at least one of the signals within a selected time slot.

2. The apparatus set forth in claim 1 including means for varying the duration of at least one of the signals within a selected time slot.

3. In an apparatus for testing a magnetic element; a write signal source; a read signal source; a pair of signal detectors; a program signal generator providing signals in a plurality of spaced time slots of a repetitive time frame; means controlled by the signals for coupling the write signal source, the read signal source, and the signal detectors to the magnetic elements in a given sequence of time slots in the repetitive time frame; and control means operable to one setting to couple one of the signal detectors to the element in a time slot and operable to another setting to couple both of the pair of detectors to the element in a time slot.

4. The apparatus set forth in claim 3 including additional control means coupled between the signal detectors and the program signal generator and operable to different settings for selecting different single time slots or different combinations of time slots in which the signal detectors are coupled to the elements.

5. An apparatus for evaluating the characteristics of a magnetic core arising from different magnetic states of the core comprising a plurality of signal sources, at least a pair of core evaluating means, program means supplying a series of control signals defining discrete time slots, first means controlled by given ones of the control signals for rendering the signal sources effective to operate the core to its different magnetic states in a given sequence of time slots, second means controlled by given ones of the control signals for rendering different ones of the core evaluating means responsive to control by the core in different ones of the time slots, and means for varying the position of the control signals within different ones of the time slots.

6. The apparatus set forth in claim 5 including means for varying the duration of the control signals in the different time slots.

7. An apparatus for evaluating the characteristics of a magnetic core placed in different magnetic states comprising program means for supplying control signals defining a series of discrete time slots, signaling means controlled by selected ones of the control signals to place the core in different magnetic states in different ones of the time slots, a plurality of core evaluating circuits rendered responsive to control by the core in a given group of the time slots under the control of the control signals, and control means for selecting the periods within the time slots of the given group of time slots in which the core evaluating circuits are rendered responsive to control by the core.

8. An apparatus for automatically determining whether the amplitude of a response signal from a magnetic core falls between two predetermined values comprising two signal responsive detecting means, a first one of the detecting means responding to an input signal of one of said values and a second one of the detecting means responding to an input signal of the other predetermined value, means coupling the detecting means to the core and rendering the two detecting means concurrently responsive to signals received from the core, signaling means coupled to the core for changing its magnetic state to produce a core response signal that is applied to the two detecting means, and storage means controlled by the two detecting means for indicating whether the core response signal had a value falling between the two predetermined values.

9. An apparatus for evaluating the characteristics of a magnetic element operable to different magnetic states comprising program means for supplying control signals representing discrete time slots, driver means coupled to the magnetic element and controlled by given ones of the control signals to place the element in its different magnetic states in different ones of the time slots, a first pair of detecting means coupled to the magnetic element for evaluating the switching time of the element, means controlled by a selected one of the control signals for sequentially rendering the first pair of detecting means responsive to control by the magnetic element at different times within one time slot, an additional detecting means coupled to the magnetic element for evaluating the amplitude of a response signal from the magnetic element, and means controlled by another of the control signals for rendering the additional detecting means responsive to control by the magnetic element in a different one of the time slots.

10. An apparatus for evaluating the characteristics of a magnetic element operable to different magnetic states comprising program means for supplying control signals representing discrete time slots, driver means coupled to the magnetic element and controlled by given ones of the control signals to place the element in its different magnetic states in different ones of the time slots, a first pair of detecting means coupled to the magnetic element for evaluating the switching time of the element, means controlled by a selected one of the control signals for sequentially rendering the first pair of detecting means responsive to control by the magnetic element at different times within one time slot, a second pair of detecting means coupled to the magnetic element for evaluating the amplitude of a response signal from the magnetic element, and means controlled by another of the control signals for rendering the second pair of detecting means concurrently responsive to control by the magnetic element in a different one of the time slots.

11. An apparatus for evaluating the characteristics of a magnetic element comprising a plurality of signal response pulse sources coupled to the magnetic element for placing the magnetic element in its different states, signal response detecting means coupled to the magnetic element and controlled by response signals received from the element for evaluating the characteristics thereof, program means for supplying a series of control signals representing discrete time slots in a time frame, first manually operable switching means for supplying the control signals in any desired combination of time slots to the pulse source to operate the element to its different magnetic states in any selected combination of time slots, and second manually operable switching means for supplying control signals to the detecting means in any desired time slots to render the detecting means capable of evaluating the characteristics of the magnetic element in the magnetic states to which it is operated in the various time slots.

12. An apparatus for evaluating at least one characteristic of a magnetic element comprising automatic handling apparatus for supplying a magnetic element to a testing station and for selectively transporting a tested element to a rejected element collecting station or an accepted element collecting station, evaluating means coupled to the magnetic element at the testing station, driver means coupled to the element at the testing station for changing the magnetic states thereof, program means for cyclically supplying a series of control signals representing different time slots in a repetitive time frame, means controlled by the control signals for rendering the driver means and evaluating means effective in different ones of the time slots to evaluate at least one characteristic of the element, means for arresting operation of the program means at the end of each time frame, and means controlled by the handling apparatus for placing the program means in operation as each element is supplied to the testing station.

13. An apparatus for evaluating at least one characteristic of an apertured magnetic core comprising an automatic core handling apparatus for feeding a core to a testing station and including classifying means for directing a tested core to an accept area or a reject area, driver means for changing the magnetic states of the core, evaluating means for evaluating at least one characteristic of the core, probe means at the testing station movable between a retracted position and inserted position passing through the apertured core, said driver means and said evaluating means being coupled to the core when the probe means is in its inserted position, first control means operable when the probe means is in its inserted position for operating the driver means to drive the core so that the evaluating means tests the desired characteristic of the core, storage means for storing the results of the test on the desired characteristics, and second control means operable when the probe means is in its retracted position for transferring the results of the test from the evaluating means to the storage means.

14. The apparatus set forth in claim 13 including means controlled by the storage means for controlling the operation of the classifying means.

15. An apparatus for evaluating the characteristics of a magnetic core operable to different magnetic states; core driver means coupled to the core for placing the core in different magnetic states; detecting means coupled to the core and responsive to signals supplied by the core to evaluate the different characteristics thereof; program means for supplying control signals representing discrete time slots in a time frame; means connected to the program means, the core driver means, and the detecting means for controlling the core driver means and the detecting means to perform a desired sequence of tests on the core during the time frame to evaluate the characteristics of the core; stop means for arresting operation of the program means at the conclusion of a time frame; and repeat means for disabling the stop means to operate the core driver means and the detecting means through a plurality of sequence of tests.

16. In an apparatus for testing a magnetic element operable between different magnetic states, a drive pulse source coupled to the element, at least first and second signal detectors coupled to the element, a time frame signal source providing a plurality of time spaced time slot signals defining different time slots in a repetitive time frame, and a plurality of enabling circuits supplied with selected ones of the time slot signals and connected to the drive pulse source and the first and second signal detectors, the enabling circuits being controlled by the time slot signals to enable the drive pulse source in given ones of the time slots that are spaced from each other in the time frame and being controlled by the time slot signals to enable different ones of the signal detectors in other ones of the time slots that follow said given time slots in the time frame, one of said given time slots being interposed in the time frame between said other time slots.

17. The apparatus set forth in claim 16 including first and second drive pulse generators in the drive pulse source, the first drive pulse generator being enabled by the enabling circuit during said given time slots, and an additional enabling circuit coupled to the time slot signal source and the second drive pulse generator and operated by the time slot signals in said other time slots for enabling the second drive pulse source during said other time slots.

18. The apparatus set forth in claim 16 in which the drive pulse source includes first and second drive pulse generators and in which the enabling circuits enable both of the drive pulse generators in one of said given time slots and engage only the first of the drive pulse generators in another one of said given time slots.

19. An apparatus for evaluating at least one characteristic of an apertured magnetic core comprising an automatic core handling apparatus for feeding a core to a testing station, driver means for changing the magnetic states of the core, evaluating means for evaluating at least one characteristic of the core, program means providing enabling signals to the driver means and the evaluating means in distinct time slots of a time frame to carry out a sequential test program on the core, inhibiting means for arresting operation of the program means at the end of a time frame, probe means at the testing station movable between a retracted position and inserted position passing through the apertured core, said driver means and said evaluating means being coupled to the core when the probe means is in its inserted position, first control means operable when the probe means is in its inserted position for disabling the inhibiting means so that the driver means and the evaluating means test the desired characteristic of the core, storage means coupled to the evaluating means for storing the results of the test on the desired characteristics, and second control means operable when the probe means is in its retracted position for transferring the results of the test from the evaluating means to the storage means.

20. An apparatus for evaluating at least one characteristic of an apertured magnetic core comprising an automatic core handling apparatus for feeding a core to a testing station, driver means for changing the magnetic states of the core, evaluating means for evaluating at least one characteristic of the core and including at least one detector operable to set and reset conditions, program means providing enabling signals to the driver means and the evaluating means is distinct time slots of a time frame to carry out a sequential test program on the core, inhibiting means for arresting operation of the program means at the end of a time frame, probe means at the testing station movable between a retracted position and inserted position passing through the apertured core, said driver means and said evaluating means being coupled to the core when the probe means is in its inserted position, first control means operable when the probe means is moved into its inserted position for operating the detector to a reset condition and for disabling the inhibiting means so that the driver means and the evaluating means test the desired characteristic of the core, storage means coupled to the evaluating means for storing the results of the test on the desired characteristics, and second control means operable when the probe means is in its retracted position for transferring the results of the test from the evaluating means to the storage means.

21. In an apparatus for testing a magnetic element having at least one opening; a write signal source coupled to the element; a read signal source coupled to the element; a signal detector coupled to the element; a program generator providing a plurality of discrete time spaced signals defining time slots in a repetitive time frame; duration control means to vary the duration of at least one of the signals within a selected time slot so that it is different from the duration of another signal in the repetitive time frame; and adjustable means controlled by selected ones of the time spaced signals and including a signal from the duration control means for rendering the write signal source, the read signal source, and the signal detector effective to supply signals to and receive signals from the magnetic element in a repetitive fixed sequence.

22. An apparatus for evaluating the characteristics of a magnetic core arising from different magnetic states of the core comprising a plurality of signal sources, at least a pair of core evaluating means, program means supplying a series of control signals defining discrete time slots, first means controlled by given ones of the control signals for rendering the signal sources effective to operate the core to its different magnetic states in a given sequence of time slots, second means controlled by given ones of the control signals for rendering different ones of the core evaluating means responsive to control by the core in different ones of the time slots, and evaluation time control means to vary the duration of the period of time during which one of the core evaluating means is responsive to control by the core in one of the time slots, so that the duration of this period differs from the duration of another period of time during which one of the core evaluating means is responsive to control by the core in the given sequence of time slots.

References Cited

UNITED STATES PATENTS

| | | | |
|---|---|---|---|
| 2,679,025 | 5/1954 | Rajchman et al. | 324—34 |
| 2,760,153 | 8/1956 | Rajchman et al. | 324—34 |
| 2,795,757 | 6/1957 | Wylen | 324—34 |
| 2,796,986 | 6/1957 | Rajchman et al. | 324—34 X |
| 2,922,518 | 1/1960 | Kristensen | 324—34 X |
| 2,934,696 | 4/1960 | Williams et al. | 324—34 |
| 2,970,690 | 2/1961 | Werner | 324—34 X |
| 3,082,374 | 3/1963 | Buuck | 324—73 |
| 3,229,195 | 1/1966 | Kadish | 324—34 |
| 3,235,802 | 2/1966 | Biard et al. | 324—73 |
| 3,248,721 | 4/1966 | Cockrell et al. | 324—73 X |
| 3,249,926 | 5/1966 | Ashley | 324—34 X |
| 3,253,134 | 5/1966 | North | 324—73 X |
| 3,302,109 | 1/1967 | Jones | 324—73 |

OTHER REFERENCES

Scheldorf et al.: Testing and Sorting Magnetic Cores, RCA TN, No. 112 (1958).

Meyers et al.: Testing Magnetic Core Planes, IBM Technical Disclosure, vol. 1, No. 2, August 1958, pp. 21 and 22.

(Other references on following page)

Healey et al.: Core Tester, IBM Technical Disclosure, vol 1, No. 2, August 1958, pp. 38 and 39.

Dawley: Magnetic Core Evaluation System, IBM Technical Disclosure, vol. 2, No. 6, April 1960, p. 126.

Shevel: Measuring and Switching Time of a Bistable Magnetic Element, IBM Technical Disclosure, vol. 3, No. 11, April 1961, pp. 60 and 61.

Center et al.: Core Characteristics Indicator, IBM Technical Disclosure, vol. 2, No. 4, December 1959, p. 139.

RUDOLPH V. ROLINEC, *Primary Examiner.*

R. J. CORCORAN, *Assistant Examiner.*

U.S. Cl. X.R.

324—73